(12) United States Patent
Sommer et al.

(10) Patent No.: US 8,550,681 B2
(45) Date of Patent: Oct. 8, 2013

(54) LIGHT SOURCE ASSEMBLIES

(75) Inventors: Rad Sommer, Sebastopol, CA (US);
Peter C. Egerton, Windsor, CA (US);
Rance M. Fortenberry, Cazadero, CA
(US); Brett Bryars, Santa Rosa, CA
(US); Michael A. Scobey, Santa Rosa,
CA (US)

(73) Assignee: Cymtec, Ltd., Caerphilly (GB)

( * ) Notice: Subject to any disclaimer, the term of this patent is extended or adjusted under 35 U.S.C. 154(b) by 141 days.

(21) Appl. No.: 12/601,184

(22) PCT Filed: May 23, 2008

(86) PCT No.: PCT/US2008/064701
§ 371 (c)(1),
(2), (4) Date: Jul. 14, 2010

(87) PCT Pub. No.: WO2008/147992
PCT Pub. Date: Dec. 4, 2008

(65) Prior Publication Data
US 2011/0170313 A1    Jul. 14, 2011

Related U.S. Application Data

(63) Continuation of application No. 11/852,683, filed on Sep. 10, 2007, now abandoned.

(51) Int. Cl.
*F21V 13/08*    (2006.01)
(52) U.S. Cl.
USPC .......................................... 362/583; 362/555
(58) Field of Classification Search
USPC ................................................. 362/583, 555
See application file for complete search history.

(56) References Cited

U.S. PATENT DOCUMENTS

| 4,047,805 | A | 9/1977 | Sekimura |
| 5,005,944 | A | 4/1991 | Laakmann et al. |
| 5,548,676 | A | 8/1996 | Savage, Jr. |
| 5,732,176 | A | 3/1998 | Savage, Jr. |
| 5,829,858 | A | 11/1998 | Levis et al. |

(Continued)

FOREIGN PATENT DOCUMENTS

| EP | 1320135 A2 | 6/2003 |
| EP | 01403688 A2 | 3/2004 |

(Continued)

OTHER PUBLICATIONS

Cassarly, B. et al. Hidden Devices that Light our World: Lightpipes, Optics & Photonics News, Aug. 2001, pp. 34-39, vol. 12. No. 8, Opt. Society of America. U.S.A.

(Continued)

*Primary Examiner* — David V Bruce
(74) *Attorney, Agent, or Firm* — Antoinette M. Tease

(57) ABSTRACT

A light source assembly comprises a light pipe, a first color light source at a first tapered light collector, a second light source at a second tapered light collector, and at least a first dichroic filter operative to pass first color light and to reflect second color light toward a light output port. A light valve may be positioned to receive light from the light pipe. One or more light entrances to the light pipe may have a filter, e.g., a short wave pass filter, oriented in a plane generally parallel to the axial optical pathway.

20 Claims, 23 Drawing Sheets

(56) References Cited

U.S. PATENT DOCUMENTS

| | | | |
|---|---|---|---|
| 6,560,038 | B1 | 5/2003 | Parkyn, Jr. et al. |
| 6,608,657 | B2 | 8/2003 | Hiyama et al. |
| 6,736,943 | B1 | 5/2004 | Scobey |
| 6,742,921 | B2 | 6/2004 | Umemoto et al. |
| 6,765,705 | B2 | 7/2004 | Ouchi |
| 6,898,020 | B2 | 5/2005 | Ouchi |
| 6,910,773 | B2 | 6/2005 | Nakashima et al. |
| 6,987,546 | B2 | 1/2006 | Ouchi et al. |
| 7,066,600 | B2 | 6/2006 | Nakashima et al. |
| 7,744,241 | B2 * | 6/2010 | Xu ................ 362/231 |
| 2002/0033909 | A1 | 3/2002 | Hiyama et al. |
| 2002/0126468 | A1 | 9/2002 | Umemoto et al. |
| 2003/0016521 | A1 | 1/2003 | Wang et al. |
| 2003/0169376 | A1 | 9/2003 | Ouchi et al. |
| 2003/0201969 | A1 | 10/2003 | Hiyama et al. |
| 2004/0056989 | A1 | 3/2004 | Betz et al. |
| 2004/0065829 | A1 | 4/2004 | Burk et al. |
| 2004/0174716 | A1 | 9/2004 | Verdes et al. |
| 2005/0018309 | A1 | 1/2005 | McGuire et al. |
| 2005/0047146 | A1 | 3/2005 | Miyata et al. |
| 2005/0087601 | A1 | 4/2005 | Gerst, III et al. |
| 2005/0093813 | A1 | 5/2005 | Yamamoto et al. |
| 2005/0134813 | A1 | 6/2005 | Yoshikawa et al. |
| 2005/0179873 | A1 | 8/2005 | Yamasaki et al. |
| 2005/0237488 | A1 | 10/2005 | Yamasaki et al. |
| 2005/0237489 | A1 | 10/2005 | Nakashima et al. |
| 2006/0044523 | A1 * | 3/2006 | Teijido et al. .............. 353/53 |
| 2006/0209421 | A1 | 9/2006 | Ouchi |
| 2006/0256441 | A1 | 11/2006 | Thiel et al. |
| 2007/0046778 | A1 | 3/2007 | Ishihara et al. |
| 2007/0097671 | A1 | 5/2007 | Walsh et al. |

FOREIGN PATENT DOCUMENTS

| | | |
|---|---|---|
| GB | 02186676 | 8/1987 |
| JP | 2004/12595 | 1/2004 |
| JP | 2005/208183 | 1/2005 |
| WO | WO 2004/011885 | 2/2004 |

OTHER PUBLICATIONS

Cuypers, Dieter, Murat, Huseyin et al. Design of New Collection Systems for Multi LED Light Engines, Proceedings of the SPIE—The International Society for Optical.

Duelli, Markus et al. Polarization Recovery System Based on Light Pipes, Projection Displays VIII. 2002, pp. 9-16, vol. 4657, Proceedings of SPIE, U.S.A.

Li, Kenneth et al. Efficient Coupling of an Array of LEDs for Projection Display, Proceedings of the SPIE—The International Society for Optical Engineering, 2005.

Krijn, et al. Light Guide Based Optical Engine for Light-Valve-Projection, Nonimaging Optics and Efficient Illuminat on Systems, Proceedings of the SPIE, pp. 17-24, vol. 5529.

Li, Kenneth et al. Etendue Efficient Coupling of Light Using Dual Paraboloid Reflectors for Projection Displays, Proceedings of the SPIE—The International Society for.

Li, Kenneth. et al. Light-Pipe-Based Optical Train and its Applications, Proceedings of the SPIE—The International Society for Optical Engineering, 2004, pp. 186-195.

Li, Kenneth. et al. Design and Optimization of Tapered Light Pipes, Nonimaging Optics and Efficient Illumination Systems, Proceedings of the SPIE, pp. 48-57, vol. 5529.

Murat, Huseyin et al. Compact LED Projector with Tapered Light Pipes for Moderate Light Output Applications, Displays, 2006, pp. 117-123, vol. 27, Elsevier.

Tanase, H. et al. A New Backlighting System Using a Polarizing Light Pipe. IBM Journal of Research and Development, May-Jul. 1998, pp. 527-536, vol. 42, No. 3-4, IBM, U.S.A.

Yong, Lu et al. Analysis for optical extend in light-pipe illumination system, Journal of Beijing University of Aeronautics and Astronautics, Jun. 2004, pp. 569-571, vol. 30.

* cited by examiner

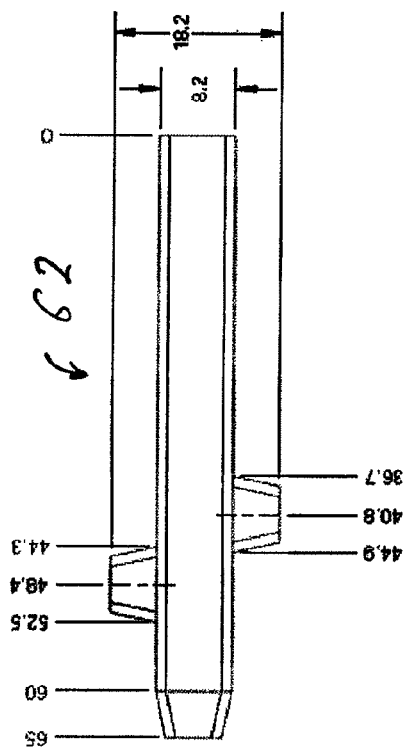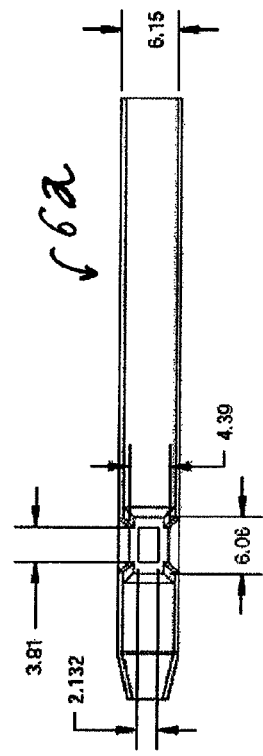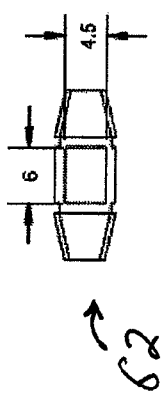

| | | |
|---|---|---|
| Substrate | TA2O5 0.00 | SIO2 6.82 |
| TA2O5 80.45 | SIO2 180.36 | TA2O5 0.14 |
| SIO2 117.32 | TA2O5 17.22 | SIO2 134.16 |
| TA2O5 66.52 | SIO2 168.46 | TA2O5 76.14 |
| SIO2 113.58 | TA2O5 61.72 | SIO2 119.03 |
| TA2O5 66.09 | SIO2 5.10 | TA2O5 61.28 |
| SIO2 120.32 | TA2O5 0.00 | SIO2 130.55 |
| TA2O5 65.33 | SIO2 212.67 | TA2O5 21.94 |
| SIO2 123.85 | TA2O5 0.00 | SIO2 159.01 |
| TA2O5 71.13 | SIO2 91.80 | TA2O5 29.33 |
| SIO2 127.63 | TA2O5 81.77 | SIO2 173.45 |
| TA2O5 67.85 | SIO2 147.40 | TA2O5 0.00 |
| SIO2 121.66 | TA2O5 77.07 | SIO2 91.80 |
| TA2O5 64.08 | SIO2 137.91 | TA2O5 78.09 |
| SIO2 119.30 | TA2O5 27.78 | SIO2 133.35 |
| TA2O5 64.62 | SIO2 21.95 | TA2O5 84.70 |
| SIO2 117.13 | TA2O5 82.72 | SIO2 145.77 |
| TA2O5 69.89 | SIO2 149.59 | TA2O5 28.94 |
| SIO2 59.74 | TA2O5 45.73 | SIO2 0.00 |
| TA2O5 0.00 | SIO2 105.94 | TA2O5 53.52 |
| SIO2 69.21 | TA2O5 39.06 | SIO2 152.81 |
| TA2O5 199.18 | SIO2 139.26 | TA2O5 82.21 |
| SIO2 135.80 | TA2O5 69.06 | SIO2 146.56 |
| TA2O5 70.90 | SIO2 123.48 | TA2O5 85.57 |
| SIO2 106.34 | TA2O5 9.95 | SIO2 6.01 |
| TA2O5 59.97 | SIO2 0.00 | TA2O5 0.00 |
| SIO2 97.93 | TA2O5 112.06 | SIO2 135.09 |
| TA2O5 77.53 | SIO2 132.74 | TA2O5 88.10 |
| SIO2 91.80 | TA2O5 70.94 | SIO2 138.98 |
| TA2O5 70.39 | SIO2 135.96 | TA2O5 84.25 |
| SIO2 19.85 | TA2O5 41.84 | SIO2 105.43 |
| TA2O5 77.69 | SIO2 91.80 | TA2O5 0.00 |
| SIO2 111.73 | TA2O5 25.22 | SIO2 41.28 |
| TA2O5 70.66 | SIO2 193.40 | TA2O5 89.70 |
| SIO2 110.90 | TA2O5 30.85 | SIO2 134.39 |
| TA2O5 35.11 | SIO2 44.04 | TA2O5 76.87 |
| SIO2 148.07 | TA2O5 69.54 | SIO2 165.23 |
| TA2O5 72.46 | SIO2 115.84 | TA2O5 189.37 |
| SIO2 133.44 | TA2O5 71.13 | SIO2 7.84 |
| TA2O5 75.48 | SIO2 127.12 | TA2O5 127.87 |
| SIO2 97.54 | TA2O5 114.03 | Air |

Fig. 24

LIGHT SOURCE ASSEMBLIES

RELATED APPLICATIONS

This application claims the priority benefit of U.S. Utility patent application Ser. No. 11/852,683, filed Sep. 10, 2007, which claims the priority benefit of U.S. Provisional Patent Application Ser. No. 60/939,716, filed May 23, 2007, both entitled "LIGHT SOURCE ASSEMBLIES." The entire contents of U.S. Utility patent application Ser. No. 11/852,683 and the entire contents of U.S. Provisional Patent Application Ser. No. 60/939,716 are incorporated herein by reference for all purposes.

INTRODUCTION

The inventive subject matter disclosed here involves a light source assembly and, in particular, a light source assembly comprising a light pipe, alternatively referred to as an optical pipe.

BACKGROUND

Light source assemblies of various types are used to provide light for projection systems and other optical equipment. Light source assemblies able to collect, pass, homogenize and/or direct light have various industrial and commercial applications. In general, devising alternative light source assemblies or improving currently known light source assemblies have proven difficult and in some cases expensive to achieve. Substantial complexity and commercial constraints exist in the various involved technologies.

It is an objective of the present disclosure to provide improved light source assemblies comprising an optical pipe and one or more associated light sources comprising a light emitting diode (LED) or other suitable light emitter.

SUMMARY

In accordance with a first aspect, a light source assembly comprises a light pipe, at least a first and second light injection port, and at least a first dichroic filter positioned in the light pipe optically between the first and second light injection port. In certain exemplary embodiments the light source assembly further comprises a first light source operative to generate a first color light at the first light injection port and a second light source operative to generate a second color light at the second light injection port, different from the first color light. The light pipe forms at least an exit or downstream light port and an elongate optical pathway to the light port from the light injection ports. Each of the light injection ports comprises a first tapered light collector. The tapered light collector is operative to pass light emitted by the associated light source into the light pipe via the associated light injection port (also referred to here in some instances as a light entrance) and to reduce the angular distribution of such light entering the light pipe from the light source. Thus, at least certain embodiments of the light source assemblies disclosed here are etendue preserving. The light injection ports into the light pipe are axially spaced. Thus, a first injection port is operative to inject light of the first color into the light pipe. A second injection port operative to inject light of a second color into the light pipe, is downstream of the first light injection port, that is, it is optically closer to the output port of the light pipe. The dichroic filter is positioned in the light pipe optically between the first and second light entrances. It is operative, as oriented in the light pipe, to pass light from the first light source toward the light port and to reflect the second color light from the second light source toward the light port. In at least certain exemplary embodiments the light pipe is operative to homogenize the first and second color lights passed simultaneously to the light port from the first and second light sources, respectively.

In accordance with a second aspect, a light source assembly comprises a light pipe forming at least a light port and an elongate axial optical pathway to the light port; a first tapered light collector; a first light source operative to generate a first color light into the light pipe at a first light entrance via the first tapered light collector, a second tapered light collector; a second light source operative to generate a second color light, different from the first color light, into the light pipe via the second tapered light collector at a second light entrance axially spaced from the first light entrance; and at least a first dichroic filter positioned in the light pipe optically between the first and second light entrances. The dichroic filter is operative, as oriented in the light pipe, to pass first color light from the first light source toward the light port, and to reflect second color light from the second light source toward the light port. The light pipe is operative to homogenize the first and second color lights passed simultaneously to the light port from the first and second light sources, respectively. The first tapered light collector is operative to reduce the angular distribution of the first color light entering the light pipe from the first light source, and the second tapered light collector is operative to reduce the angular distribution of the second color light entering the light pipe from the second light source.

Those of ordinary skill in the art will recognize that the light source assemblies disclosed here present significant technical and commercial advantages. Likewise, those of ordinary skill in the art will recognize that innumerable modifications can be made and other features are aspect added without departing from the principles disclosed here.

A light source assembly for providing a homogenized light beam includes a first light source, a second light source, and an optical pipe that defines a pipe passageway. The first light source generates a first light that is directed into the pipe passageway at a first region. The second light source generates a second light that is directed into the pipe passageway at a second region that is different than the first region. The optical pipe homogenizes the first light and the second light. With this design, the present invention provides a way to combine multiple lights to generate a uniform light beam with a relatively small package.

Additionally, the light source assembly can include a third light source that generates a third light that is directed into the optical pipe at a third region that is different than the first region and the second region. In this embodiment, the optical pipe homogenizes the first light, the second light, and the third light. With this design, one of the light sources can be a red LED that generates red light, one of the light sources can be a blue LED that generates blue light, and one of the light sources can be a green LED that generates green light.

Additionally, the light source assembly can include a blue pass filter that is positioned between the blue LED and the pipe passageway. The blue pass filter (i) transmits a high percentage of blue light that is within a blue predetermined angle of incidence range, (ii) reflects a high percentage of blue light that is outside the blue predetermined angle of incidence range, (iii) reflects a high percentage of green light, and (iv) reflects a high percentage of red light.

Moreover, the light source assembly can include a green pass filter that is positioned between the green LED and the pipe passageway. The green pass filter (i) transmits a high percentage of green light that is within a green predetermined angle of incidence range, (ii) reflects a high percentage of green light that is outside the green predetermined angle of incidence range, and (iii) reflects a high percentage of red light.

The light source assembly can also include a blue dichroic filter and/or a green dichroic filter positioned in the pipe passageway. The blue dichroic filter (i) transmits a high percentage of red light and green light, and (ii) reflects a high percentage of blue light. The green dichroic filter (i) transmits a high percentage of red light, and (ii) reflects a high percentage of green light.

In one embodiment, (i) the first light source directs the first light into the pipe passageway transverse to a passageway axis of the pipe passageway, and/or (ii) the second light source directs the second light into the pipe passageway transverse to the passageway axis of the pipe passageway. In one embodiment, the first light and the second light are directed into the pipe passageway at an angle that is approximately 90 degrees relative to the passageway axis.

Additionally, the present invention is directed to a light source assembly that includes (i) an optical pipe that defines a pipe passageway; (ii) a red LED that generates a red light that is directed into the pipe passageway at a first region; (iii) a green LED that generates a green light that is directed into the pipe passageway at a second region that is different than the first region; (iv) a green pass filter positioned between the green LED and the pipe passageway, the green pass filter (a) transmitting a high percentage of green light that is within a green predetermined angle of incidence range, (b) reflecting a high percentage of green light that is outside the green predetermined angle of incidence range, and (c) reflecting a high percentage of red light; (v) a blue LED that generates a blue light that is directed into the pipe passageway at a third region that is different than the first region and the second region; and (vi) a blue pass filter positioned between the blue LED and the pipe passageway, the blue pass filter (a) transmitting a high percentage of blue light that is within a blue predetermined angle of incidence range, (b) reflecting a high percentage of blue light that is outside the blue predetermined angle of incidence range, (c) reflecting a high percentage of green light, and (d) reflecting a high percentage of red light.

The present invention is also directed to a method for generating a homogenized light beam for a precision apparatus. The method can include the steps of (i) generating a first light with a first light source; (ii) generating a second light with a second light source; and (iii) homogenizing the first light and the second light with an optical pipe that defines a pipe passageway. In this embodiment, the first light is directed into the pipe passageway at a first region, and the second light is directed into the pipe passageway at a second location that is different than the first region.

BRIEF DESCRIPTION OF THE DRAWINGS

FIGS. 6-8 show plan, elevation and end views, respectively, of a light source assembly in accordance with certain exemplary embodiments of the present disclosure;

FIG. 24 is a chart that lists the layer of materials for making a filter having features of the present invention.

DETAILED DESCRIPTION OF CERTAIN EXEMPLARY EMBODIMENTS

Figure 1:
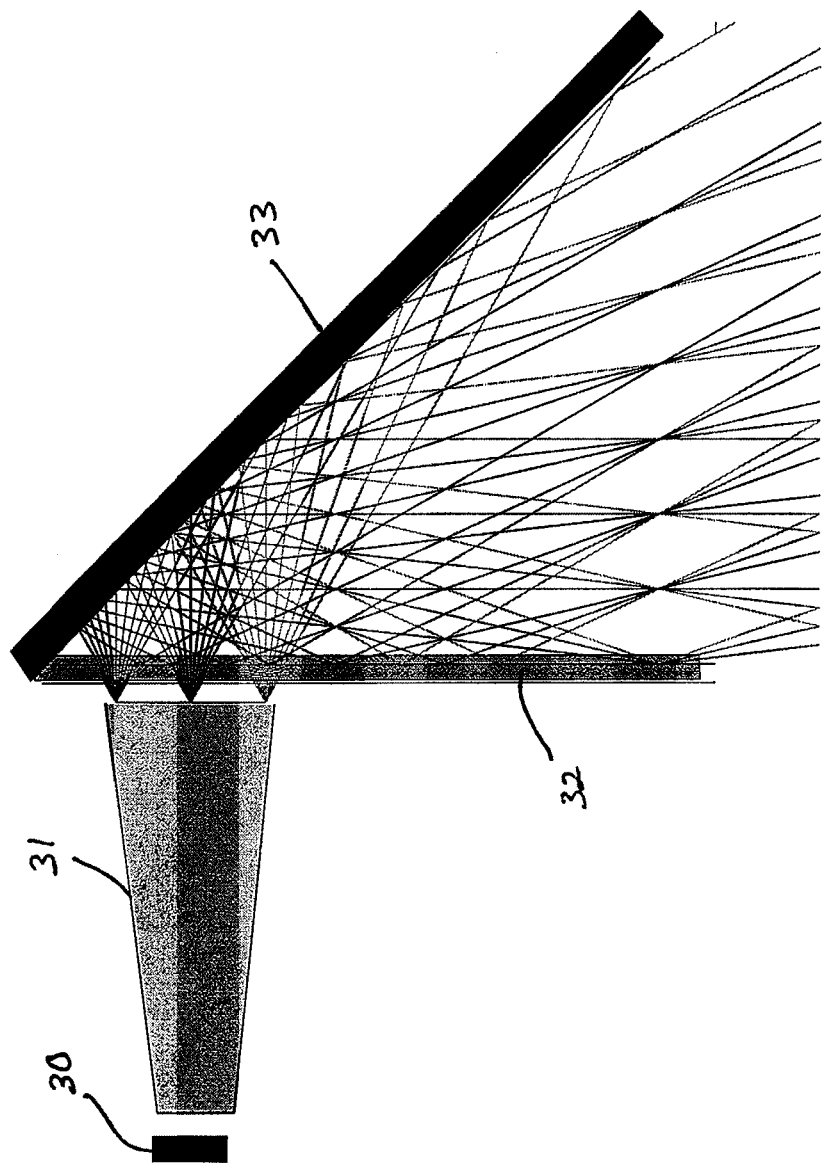
FIG. 1 is a schematic illustration of a light injection port subassembly in accordance with certain exemplary embodiments of the present disclosure.

The following detailed description of certain exemplary embodiments is not intended to limit the scope of the disclosure to merely those exemplary embodiments, but rather to be illustrative of such scope. It will be apparent to those of ordinary skill in the art that various different embodiments of the light source assemblies disclosed here are suitable to be adapted for use in innumerable video projection and display applications and the like. Advantageously, for example, at least certain embodiments of the light source assemblies disclosed here are suitable to have 3, 4, 5 or even more light injection ports.

In certain exemplary embodiments of the light source assemblies disclosed here, multiple light sources are arranged to feed light of different colors or wavelengths into a light pipe operative to homogenize the light. The different color light sources feed into the light pipe at spaced locations, with dichroic filters being positioned diagonally across the light path in the light pipe at correspondingly spaced locations. Dichroic filters and angle-dependent, wavelength selective pass filters (or "Z-filters"), described further below, control the flow of light into and through the light pipe from at least selected light sources associated with the light pipe. In certain exemplary embodiments a light pipe assembly has dual angle-dependent, wavelength-selective pass filters for one or more of the multiple light sources, that is, both a horizontal angle-dependent, wavelength-selective pass filter and a vertical angle-dependent, wavelength-selective pass filter associated with a light injection port feeding a particular light color into the light pipe. As illustrated below, the angle-dependent, wavelength-selective pass filters of the light pipes and light source assemblies disclosed here pass the associated or corresponding wavelength range at certain angles of incidence and reflect at other angles. Each of the dichroic filters passes color(s) from any light source which is upstream of that filter and reflects color(s) fed downstream of it. Certain exemplary embodiments employ a single or mono angle-dependent, wavelength-selective pass filter at a feed or color injection port, and such angle-dependent, wavelength-selective pass filter is not reflective of any color(s) fed into the light pipe downstream of that filter. As illustrated below, in certain exemplary embodiments of the light pipe assemblies disclosed here, the angle-dependent, wavelength-selective pass filters pass wavelength ranges different from each other, rather than all passing the full spectrum of wavelengths handled by the light pipe. Substantial cost savings can be achieved in the design and production of such sequentially varying, angle-dependent pass filters as compared to a set of filters all operative to pass the full spectrum of wavelengths.

The angle-dependent, wavelength-selective pass filters are etendue preserving or contribute to the etendue preserving characteristics of the assembly, particularly in combination with the dichroic filters of the light assemblies. The filters can be short wave pass filters in certain embodiments, and in certain embodiments can serve to increase the efficiency of the light pipe assembly. The filters typically, including those shown in the illustrated embodiments discussed below, are transmissive at least of the color fed by the associated light source within a low angle of incidence range, e.g., 0°-30°. Thus, each such angle-dependent, wavelength-selective pass filter is transmissive at the angle at which light is initially fed into the light pipe through that filter from the associated light source. The filter is reflective of those same wavelengths from the associated light source within a high angle of incidence range, e.g., 60°-90°. Also, the filter is reflective of other colors fed into the light pipe, at least from upstream light sources and at least within the high angle of incidence range, e.g., 60°-90°. The angle-dependent, wavelength-selective pass filters described here can be, but need not be reflective of other colors, i.e., any colors fed into the light pipe downstream of that filter. Likewise, such filters can be, but need not be reflective of any of the colors at the mid-range of angles of incidence.

In that respect, at least for applications in which the human eye is the ultimate detector, such as a video display, an advantageous order of the LED colors, i.e., of the light injection ports into the light pipe, has been found to be (from the rear of the unit to the front, where the front is the end at which light exits the pipe in a combined or homogenized condition) is red, green, blue. Such sequence is found to facilitate filter design. In particular, for example, certain embodiments of the light source assemblies disclosed here, having a red, green, blue sequence from back to front facilitates horizontal angle-dependent, wavelength-selective pass filter designs more readily produced using current commercial filter production equipment and techniques. Other color sequences also are found to be advantageous in at least certain embodiments. The sequence blue, green, red facilitates vertical filter designs more readily produced using current commercial filter production equipment and techniques. The sequence green, blue, red involves injecting the green color light at the beginning, that is, at the back of the light pipe, and may provide in at least certain exemplary embodiments, better overall efficiency. For applications in which the absolute number of photons (optical power) is more important, an advantageous order may be different. The human eye sensitivity drives the previous scenario (i.e., the eye is not as sensitive to blue as it is to green, but the raw number of photons drives the desired balance in other instrumentation. In that case, blue may more advantageously be positioned at the back, because blue LEDs are efficient. Without wishing to be bound by theory, it currently is understood that there is more photonic energy in blue LED light output than in the green or red portions of the spectrum.

In certain embodiments high index filters are used for the dichroic filters and are advantageously found to be less sensitive to angle of incidence. For example, filters having an index of refraction n greater than 1.9, an even greater than 2.0 are within the design capability of those skilled in the art given the benefit of this disclosure.

A collimator optionally is employed with one or more, e.g., each, of the light sources. Also within the scope of this disclosure are various alternative sequences of the light sources (e.g., green/blue/red, etc.), as further presented below. In certain exemplary embodiments of the light source assemblies disclosed here, at least one of the tapered light collectors comprises a tapered hollow light pipe or a solid-body molded plastic light pipe. The tapered light collector is "operative to reduce the angular distribution of the first color light entering the light pipe from the first light source" means that it, at least, results in the angular distribution of the light is smaller or tighter or similarly improved in contrast to the angular distribution which would result from the same configuration (position, sizes, etc.) of the light pipe and light source(s) without the tapered collimator.

Referring now to the drawings, the arrangement of FIG. 1 shows an LED 30 (blue in the illustration, but optionally any other color/wavelength) with an associated light collector 31, e.g., a lens and/or a tapered secondary (or feeder) light pipe, etc., to collect the light output of the LED and pass it through an angle-dependent, wavelength-selective pass filter 32, optionally here referred to as a Z-filter or a feed filter, to the light pipe, i.e., to the main or primary light pipe wherein multiple light colors are passed along a common light path. The LED feed filter, optionally referred to as a horizontal filter (notwithstanding that it is shown in a vertical position in FIG. 1) in view of its orientation substantially normal to the longitudinal axis of the light path from the LED to the filter, can be in certain exemplary embodiments a short wave pass filter operative to pass low angle light rays, i.e., light impinging on the filter at low angles of incidence, e.g., at least light incident at an angle within the range of 0-30°, and further operative to pass high angle light rays, i.e., light hitting the surface of the filter at a high angle of incidence, e.g., at least light incident at an angle that is near normal to the plane of the filter surface, e.g., within the range of 60-90°. The light pipe filter 33 oriented diagonally to the longitudinal axis of the light path from the LED to the angle-dependent, wavelength-selective pass filter, can be in certain exemplary embodiments be reflective of all LED feed colors to be passed along the common light path of the light pipe. Alternatively, as discussed further below, especially in embodiments of the light pipe assemblies disclosed here wherein one or more LED feeds are upstream of the one feed shown in FIG. 1, the diagonal filter can be operative to pass such upstream colors or, in certain exemplary embodiments, to pass such upstream colors which are incident at a high angle, e.g., at least light incident at an angle within the range of 60-90°. Thus, the diagonal filter in such exemplary embodiments would pass at least light traveling generally axially along the primary light path in the light pipe.

Figure 2:
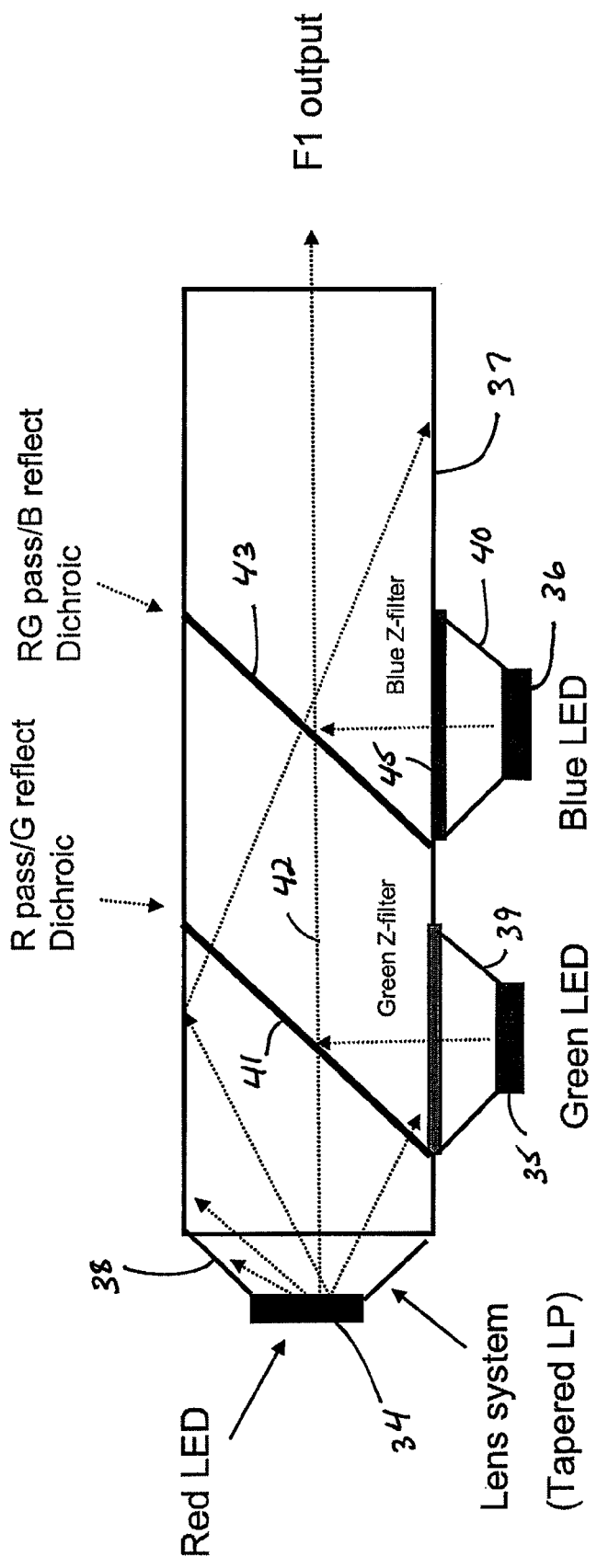
FIG. 2 is a schematic illustration of a light source assembly in accordance with certain exemplary embodiments of the present disclosure, employing injection port filters, optionally referred to here in some instances as Z-filters, for selected light injection ports, together with dichroic filters optically interposed between axially spaced light injection ports.

FIG. 2 shows a light pipe design employing single Z-filters for each downstream LED light feed, i.e., for the green and blue LEDs in the illustrated embodiment. The light pipe design of FIG. 2 comprises red, green and blue LED feeds 34, 35, 36, in that order from upstream to downstream, into the light pipe 37. The red LED emits red light into the light pipe via a lens system or the like, such as a tapered feeder light pipe 38. The green and blue LEDs each likewise emits light into the light pipe via a tapered feeder light pipe, lens, etc., 39, 40. The dichroic filter 41 for the green LED, oriented diagonally to the common light path 42 of the light pipe, i.e., to its primary axial light path, passes red light from the red LED, which is seen to be upstream of the green LED, and reflects green light. The dichroic filter for the blue LED passes red light from the red LED and green light from the green LED, both of which are upstream of the blue LED, and reflects blue light. The horizontal LED feed filters 44, 45 can be short wave pass filters in accordance with the operating principles discussed above for the horizontal blue LED feed filter discussed above in connection with the embodiment of FIG. 1. Thus, the green and blue Z-filters in embodiments consistent with FIG. 2 can be operative to pass low angle light rays, e.g., at least light incident at an angle within the range of 0-30°, and further operative to pass high angle light rays, e.g., at least light incident at an angle that is near normal to the plane of the filter surface, e.g., within the range of 60-90°. At least certain embodiments of the light pipe assemblies disclosed here, including, for example, those in accordance with the assembly illustrated in FIG. 2, having such reflectivity and light transmission properties, are etendue preserving such that light is passed from the light pipe at the downstream outlet of the light pipe as F1 output at 60°-90°. In the illustrated embodiment of FIG. 2, no light filter is employed for the red LED, although those skilled in the art will appreciate, given the benefit of this disclosure, that a filter, lens, etc. may optionally be employed.

Figure 3:
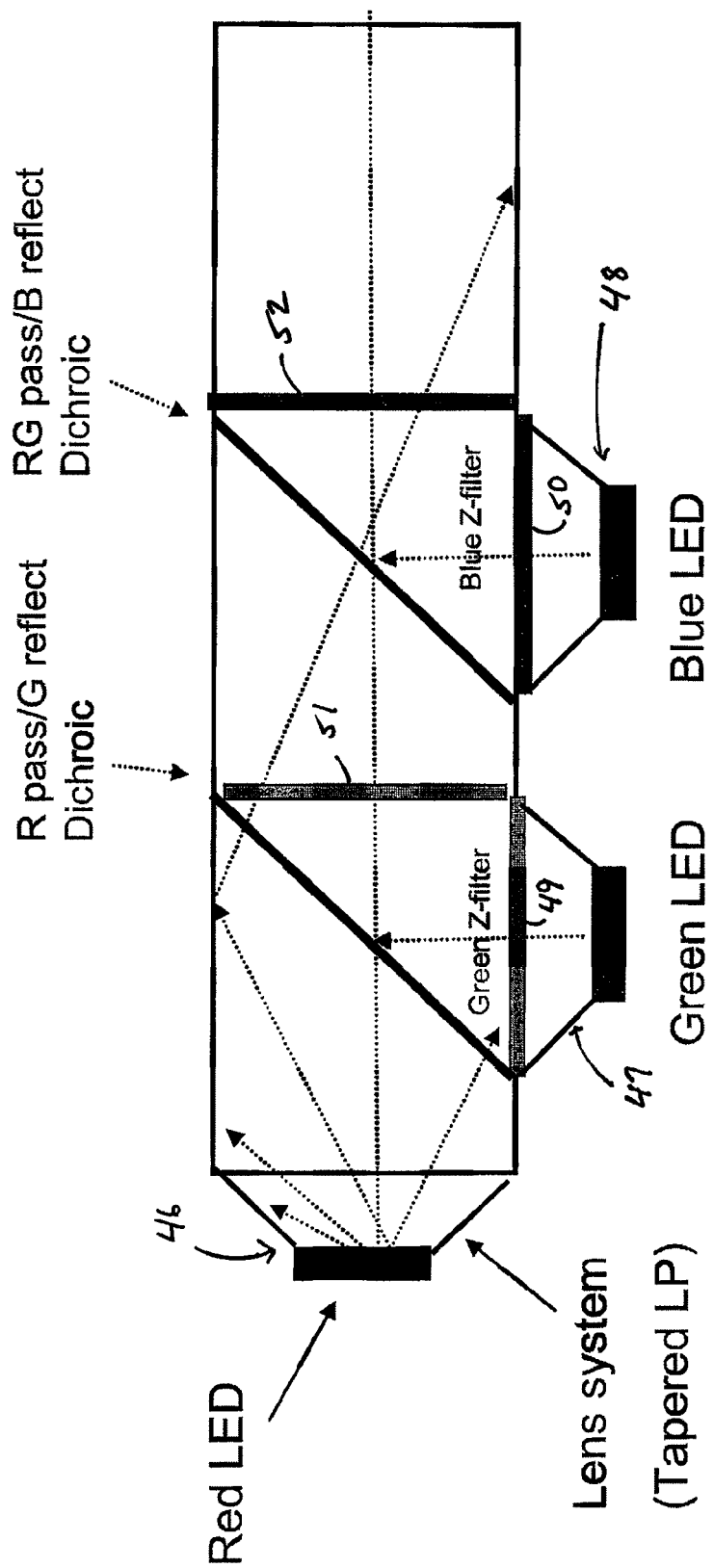
FIG. 3 is a schematic illustration of a light source assembly in accordance with an alternative exemplary embodiment of the present disclosure, employing dual injection port Z-filters for selected light injection ports, together with dichroic filters optically interposed between axially spaced light injection ports.

FIG. 3 shows a dual filter design, i.e., a design with dual angle-dependent, wavelength-selective pass filters at one or more light input ports, for a light pipe having red, green, and blue LED light sources 46, 47, 48, in that order from upstream to downstream. Each horizontal angle-dependent, wavelength-selective pass filter is simply a short wave pass filter. Each vertical angle-dependent, wavelength-selective pass filter 49, 50 is operative to pass two colors or three colors. Specifically, the vertical z-filter 51 for the green LED passes red light and passes green light at high angles of incidence. It reflects green light at low angles of incidence. The vertical z-filter 52 for the blue LED is optional and passes red light and green light, as well as blue light at high angles of incidence. It reflects blue light at low angles of incidence. In embodiments of the light pipe assemblies disclosed here which are consistent with FIG. 3, a light filter at the injection port for the red LED may be employed but is optional. Thus, those skilled in the art will appreciate, given the benefit of this disclosure, that a filter, lens, etc. may optionally be added for the red LED in the assembly illustrated in FIG. 3. At least certain embodiments having the reflectivity properties mentioned above provide light output at the downstream (right side in FIG. 3) output of the light pipe as F1 light output at 60°-90°.

Figure 4:
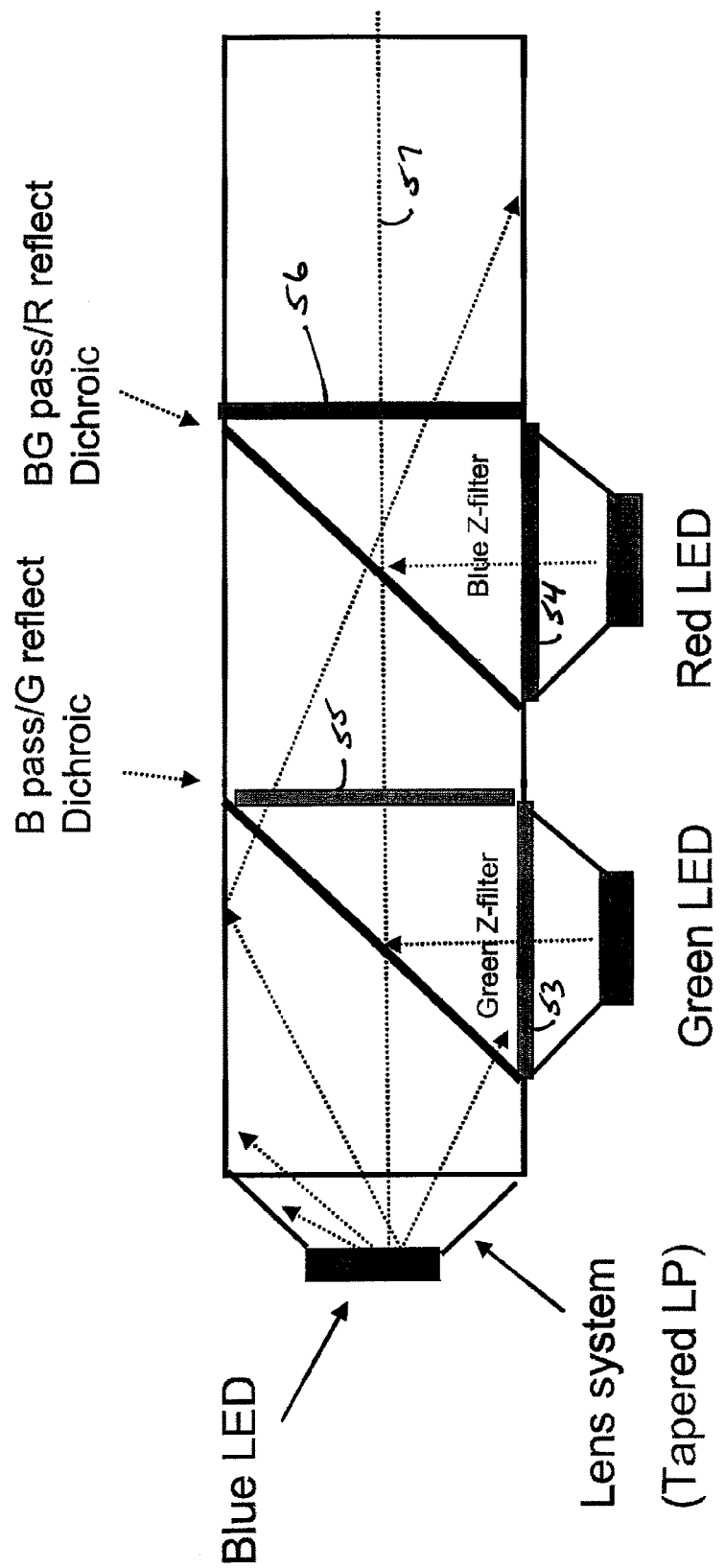
FIG. 4 is a schematic illustration of an alternative embodiment of a light source assembly in accordance with the present disclosure, wherein the injection ports are sequenced differently with respect to wavelength or color of the injected light.

FIG. 4 shows a dual filter design for a light pipe having a blue, green, red LED sequence. Each horizontal angle-dependent, wavelength-selective pass filter 53, 54, i.e., the filters positioned at a color's injection port into the light pipe (i.e., into the primary light pipe) passes the injected color, at least at high angles of incidence, and reflects the upstream colors. In at least certain exemplary embodiments the horizontal filter 53 for the green LED reflects blue light, at least at high angles of incidence, reflects green light at low angles of incidence, and passes green light at high angles of incidence, e.g., 60°-90°, such as light directly from the green LED along the longitudinal axis of the light main light path from the green LED to the associated horizontal filter. The horizontal filter 54 for the red LED passes red light at high angles of incidence, reflects red light at low angles of incidence, and reflects green and blue light at least at high angles of incidence. The green LED and the red LED each also has a vertical angle-dependent, wavelength-selective pass filter. The vertical filter 55 associated with the green LED and the vertical filter 56 associated with the red LED, which are positioned in the light pipe and oriented substantially perpendicular or normal to the primary light path 57 of the light pipe, each can be provided as a short wave pass filter operative to pass the upstream colors incident on the filter, at least at a large angle of incidence, e.g., at 60°-90°.

Figure 5:
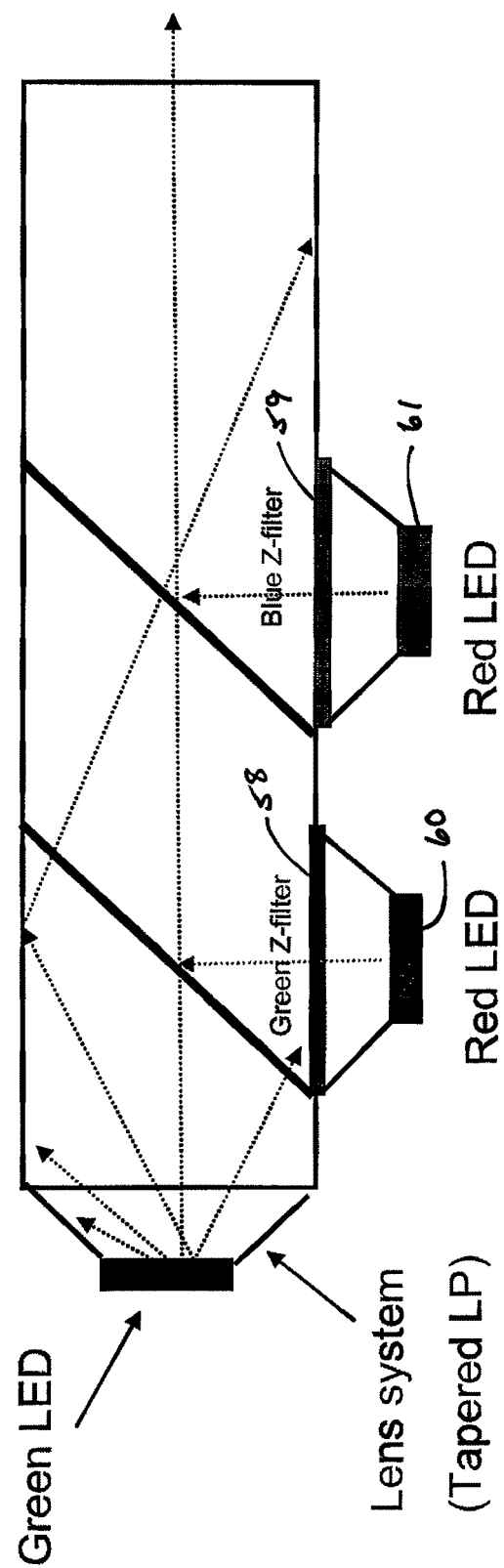
FIG. 5 is a schematic illustration of an alternative embodiment of a light source assembly in accordance with the present disclosure, wherein the injection ports are sequenced differently with respect to wavelength of the injected light.

FIG. 5 shows a mono-filter design, an angle-dependent, wavelength-selective pass filter design for a green, blue, red LED injection sequence. Each horizontal angle-dependent, wavelength-selective pass filter is a short wave pass filter. The horizontal z-filter 58 for the blue LED 60 passes blue light at high angles of incidence and reflects blue light at low angles of incidence. Further, it is operative to reflect green light from the upstream green LED at least at high angles of incidence. The red LED's 61 horizontal angle-dependent, wavelength-selective pass filter 59 is operative to pass red light from the associated red LED and to reflect blue and green light emitted by the upstream LEDs and passed downstream along the light path of the light pipe. In certain alternative embodiments otherwise consistent with the illustrated embodiment of FIG. 5, red LED's horizontal angle-dependent, wavelength-selective pass filter is omitted, as it has been determined and that substantial cost savings can be thereby achieved with only small loss of red light throughput, e.g., approximately 5% or less reduction in red light efficiency for the overall light pipe assembly. Further in this regard, the upstream/downstream positions of the red and blue LEDs can be reversed in alternative embodiments. In such alternative embodiments, the horizontal angle-dependent, wavelength-selective pass filter for the blue LED can be omitted on the same principles discussed immediately above with respect to omitting the red LED horizontal angle-dependent, wavelength-selective pass filter in the illustrated embodiment of FIG. 5. In the illustrated embodiment of FIG. 5, no light filter is employed for the upstream green LED, although those skilled in the art will appreciate, given the benefit of this disclosure, that a filter, lens, etc. may optionally be employed. At least certain exemplary embodiments of the light pipe assemblies disclosed here comprise for the various LEDs associated etendue preserving structure for passing light into the light pipe, e.g., a lens system or the like, such as a tapered feeder light pipe.

Light pipe assembly dimensions for certain exemplary embodiments in accordance with the present disclosure are shown in FIGS. 6-8. The overall length of the light pipe 62 is 65 mm, including a tapered portion at the upstream (left-hand side in FIG. 6) suitable for use as an axial-end injection port, i.e., an injection port for a first LED. The lateral dimension of the main light pipe, that is, its outside cross-sectional dimension, is 8.2 mm by 6.15 mm. The inside dimension is 6.0 mm by 4.5 mm. For ease of construction, the light pipe may be constructed with flat sidewalls in a square or other rectangular cross-sectional figuration. Each of the two side injection ports for additional LEDs has an outside axial dimension (i.e., a dimension measured along the longitudinal direction of the main light pipe) of about 8.2 mm at its largest point where it joins the main light pipe, and a lateral dimension of about 5.0 mm. The tapered light pipes of the LED injection ports have an inside axial dimension (i.e., a dimension measured along the longitudinal direction of the main light pipe) tapering from 6.06 mm to 3.81 mm. The second (i.e., middle) LED injection port is 7.5 mm from the axial-end injection port. The third (i.e., left-most) LED injection port axially overlaps the second LED injection port by approximately 0.6 mm. While this configuration and these dimensions have been found to be advantageous for at least certain exemplary embodiments of light pipe assemblies in accordance with this disclosure, those of ordinary skill in the art, given the benefit of this disclosure, will recognize that innumerable alternative configurations and dimensions are possible for other embodiments of the light pipes disclosed here.

Figure 9:
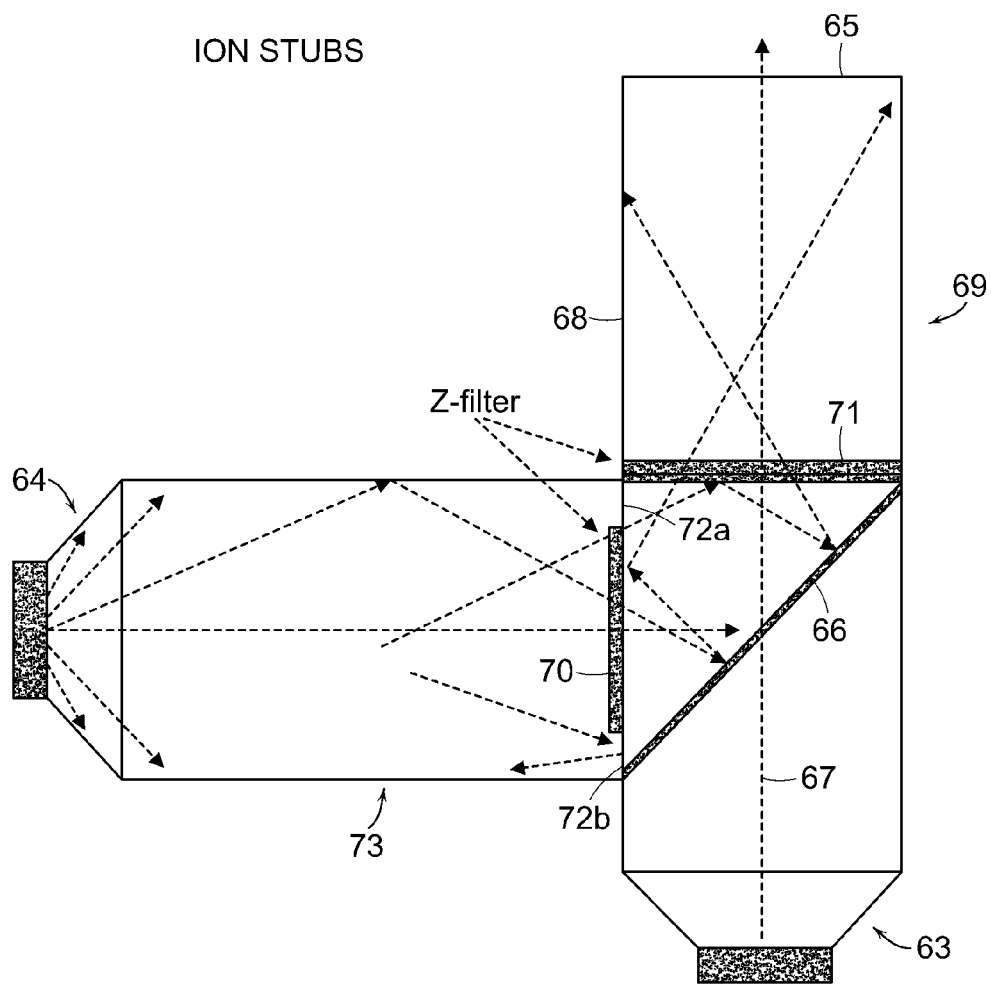
FIG. 9 is a schematic illustration of an alternative embodiment of a light source assembly in accordance with the present disclosure, employing dual injection port Z-filters for a light injection port, along with recirculation stubs, together with a dichroic filter optically interposed between axially spaced light injection ports.
Figure 10:
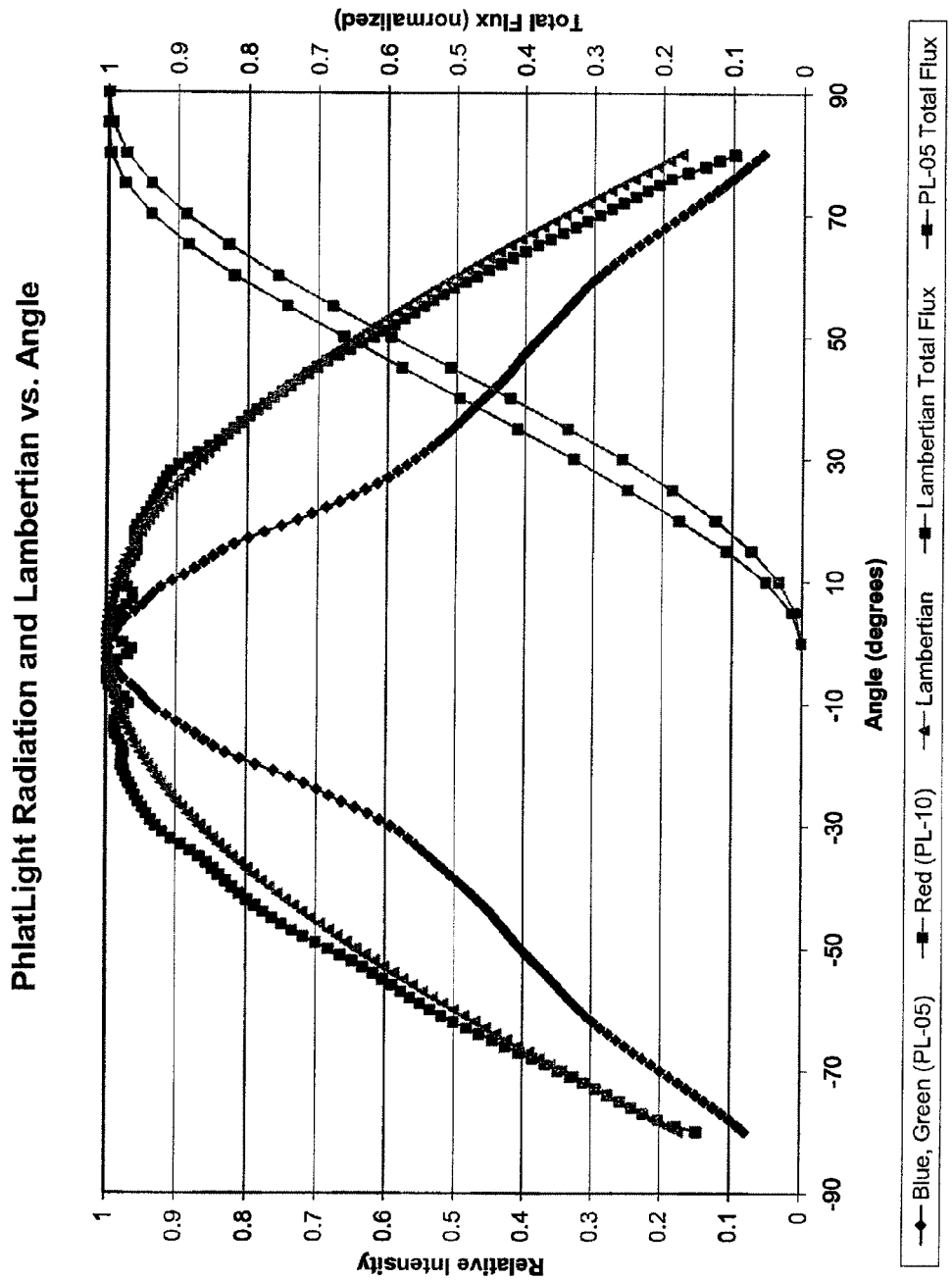
FIG. 10 is a graphical representation of LED energy angular displacement in an exemplary embodiment of a light source assembly in accordance with the present disclosure.

FIG. 9 illustrates an alternative embodiment of the light pipe assemblies disclosed here. As seen in FIG. 9, the red LED injection port 63 is upstream of the green LED injection port 64. The red LED is axially in line with the main output port 65 of the light pipe. A dichroic filter 66 oriented diagonally across the axial light path 67 from the red LED to the main output port passes red light emitted by the red LED and reflects green light emitted by the green LED. The green LED injection port is at a side wall 68 of the light pipe 69. The horizontal angle-dependent, wavelength-selective pass filter 70 for the green LED, which is positioned in-line with the side wall 68 of the main light pipe (and is oriented vertically in the illustration of FIG. 9) reflects light above 60° and passes might below 60°. The second angle-dependent, wavelength-selective pass filter 71 passes the red and green lights. The red LED being at the most upstream of the injection ports simplifies the filter design for embodiments in accordance with FIG. 9. Those of ordinary skill in the art will recognize, however, that alternative sequences are possible for the LEDs without departing from the principles disclosed here.

The embodiment of FIG. 9 also illustrates an optional feature of the light pipe assemblies disclosed here. Specifically, stubs 72a, 72b are provided at the periphery of the green LED's horizontal angle-dependent, wavelength-selective pass filter. Such stubs may be used for any or all of the LED injection ports. The stubs provide certain degree of light recirculation within the injection port sub-assembly 73 and rely upon the LED's surface being somewhat reflective. Improved efficiency can be achieved through the use of such stubs in at least certain embodiments of the light pipe assemblies disclosed here.

Figure 11:
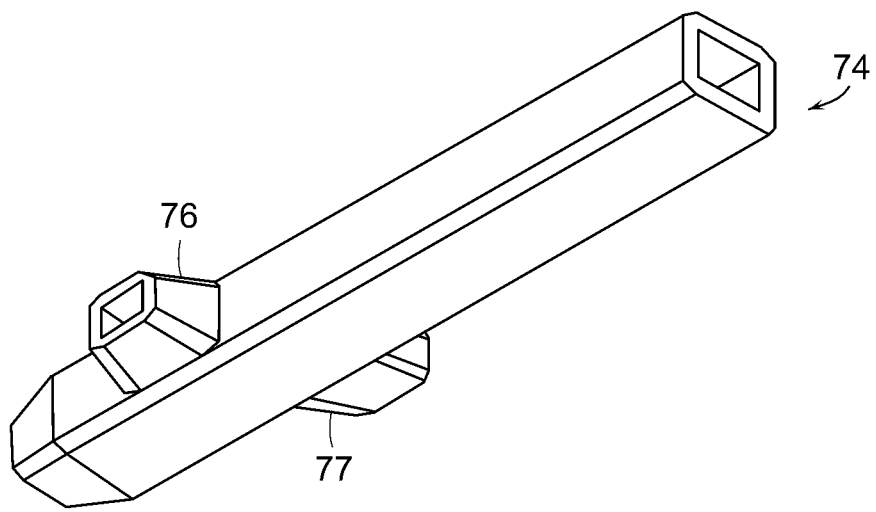
FIGS. 11 and 12 are schematic perspective views of an exemplary embodiment of a light source assembly in accordance with the present disclosure.
Figure 12:
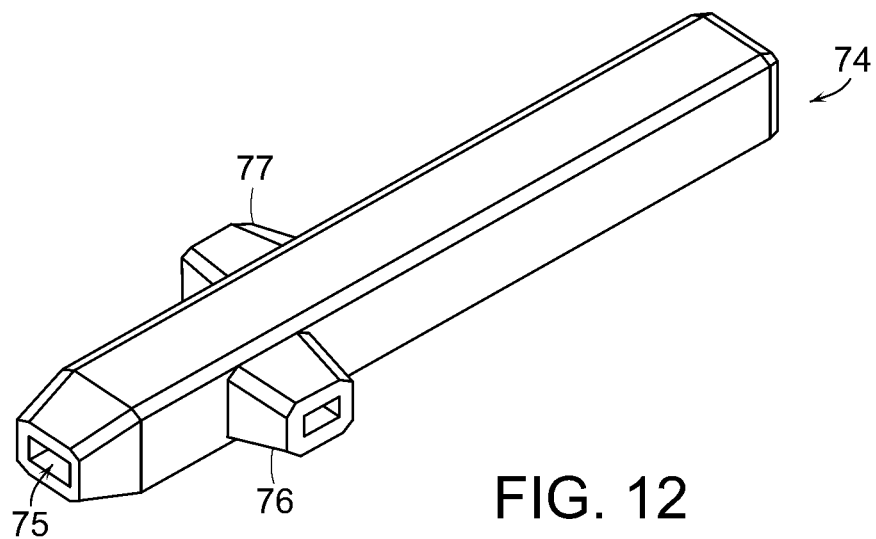

FIGS. 11 and 12 are perspective views, from different angles, of one embodiment 74 of a light pipe assembly in accordance with the present disclosure. The light pipe assembly of FIGS. 11 and 12 has 3 light injection ports, including an axial injection port 75 at the upstream end and two lateral injection ports 76, 77. In this regard, it should be understood that any of the features discussed or disclosed here for any injection port may be used in any permutation or combination with any other such disclosed injection port feature(s). Likewise, any other light pipe features discussed or disclose here may be used in any combination or permutation with any other such discussed or disclosed features. Typically, but not necessarily in all embodiments, a different light color will be injected at each of the three ports, four total of three different colors. The light may be emitted by associated LEDs or other suitable light sources. Blue, green and red light sources may be used, for example, in any order or sequence.

Figure 13:
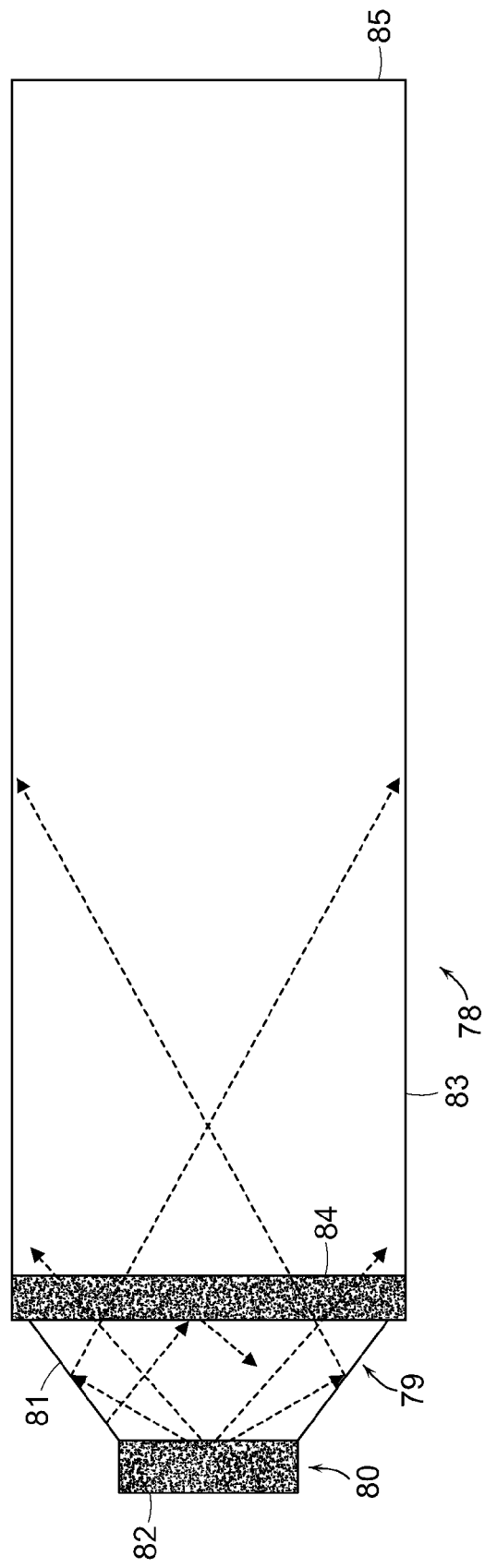
FIG. 13 is a single color or single wavelength light pipe in accordance with an exemplary embodiment of the present disclosure.
Figure 14:
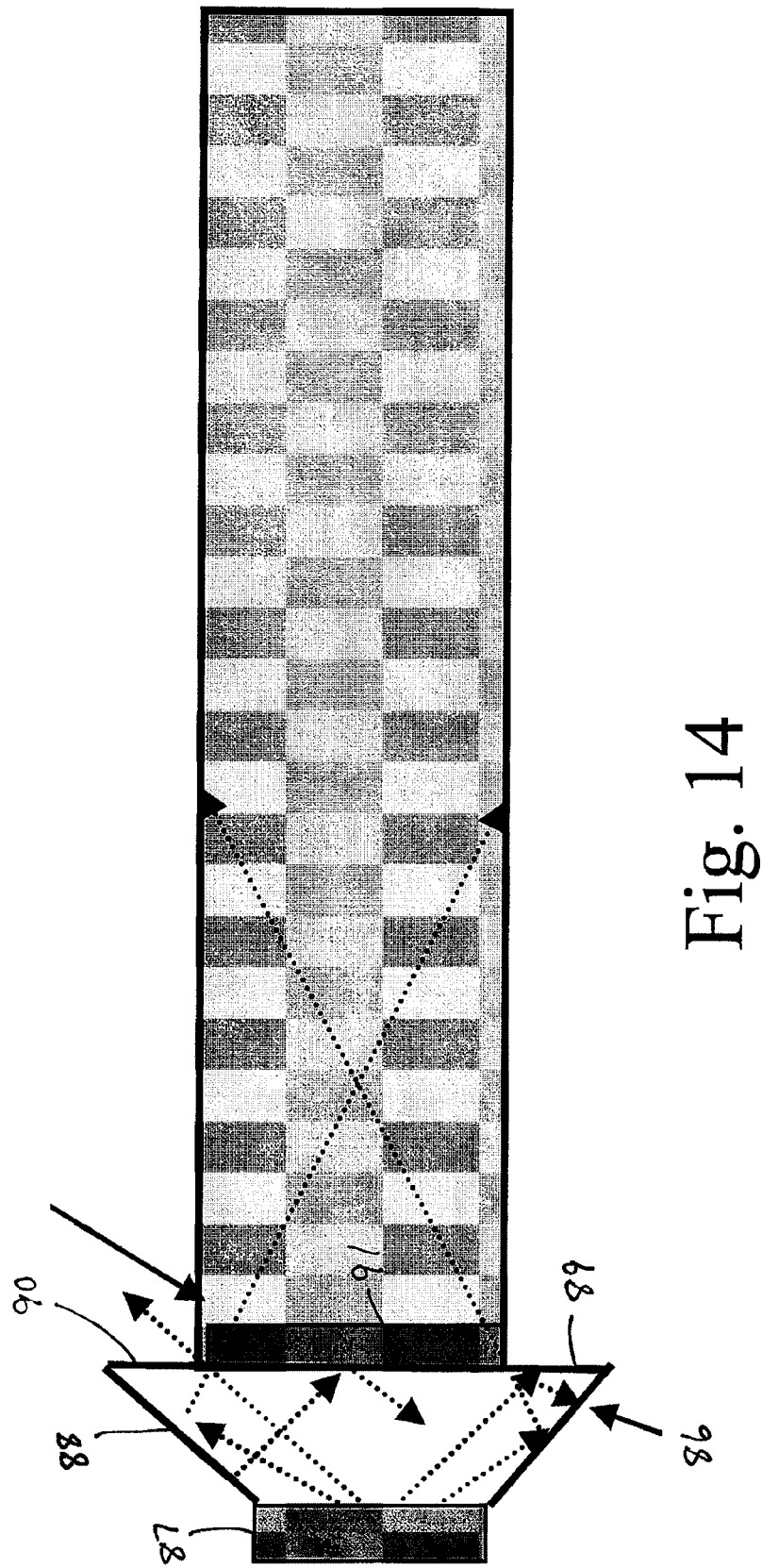
FIG. 14 is a single color or single wavelength light pipe in accordance with an exemplary embodiment of the present disclosure, employing recirculation stubs in the light injection port subassembly.

FIGS. 13 and 14 illustrate alternative embodiments of a single color or single wavelength light pipe in accordance with the present disclosure. FIG. 13 illustrates a single color light pipe embodiment 78 in accordance with the present disclosure. An axial injection port 79 comprises an LED light source 80 and an associated tapered feeder light pipe 81. The LED 82 itself in certain exemplary embodiments is sufficiently reflective to provide a useful level of recirculation of the emitted light. Light emitted by the LED light source passes into the light pipe 83 through an angle-dependent, wavelength-selective pass filter 84, that is, through a filter which passes the emitted light at high angles of incidence, e.g., 60°-90°, and reflects such light at small angles of incidence, e.g., 0°-30°. Optionally, the angle-dependent, wavelength-selective pass filter can be positioned further downstream, typically, but not necessarily, retaining its orientation in a plane substantially normal to the longitudinal axis of light pipe. The light output of the light pipe is unpolarized, although a polarizer could be used instead of, or in series with, the angle-dependent, wavelength-selective pass filter. For example, a polarizer filter could be positioned at the outlet port 85 of the light pipe (that is, at the extreme right end of the light pipe, as shown in FIG. 13), typically, but not necessarily, being oriented in a plane normal to the longitudinal axis of the light pipe.

FIG. 14 illustrates an alternative single color light pipe embodiment in accordance with the present disclosure. An axial injection port 86 comprises an LED light source and an associated tapered feeder light pipe 88. The LED itself in certain exemplary embodiments is sufficiently reflective to provide a useful level of recirculation of the emitted light. The feeder light pipe also employs stubs 89, 90 in the injection port sub-assembly 86 for recirculation and etendue improvement. Light emitted by the LED light source passes into the light pipe through an angle-dependent, wavelength-selective pass filter 91, that is, through a filter which passes the emitted light at high angles of incidence, e.g., 60°-90°, and reflects such light at small angles of incidence, e.g., 0°-30°. The light output of the light pipe is unpolarized, although a polarizer could be used instead of, or in series with, the angle-dependent, wavelength-selective pass filter.

Figure 15:
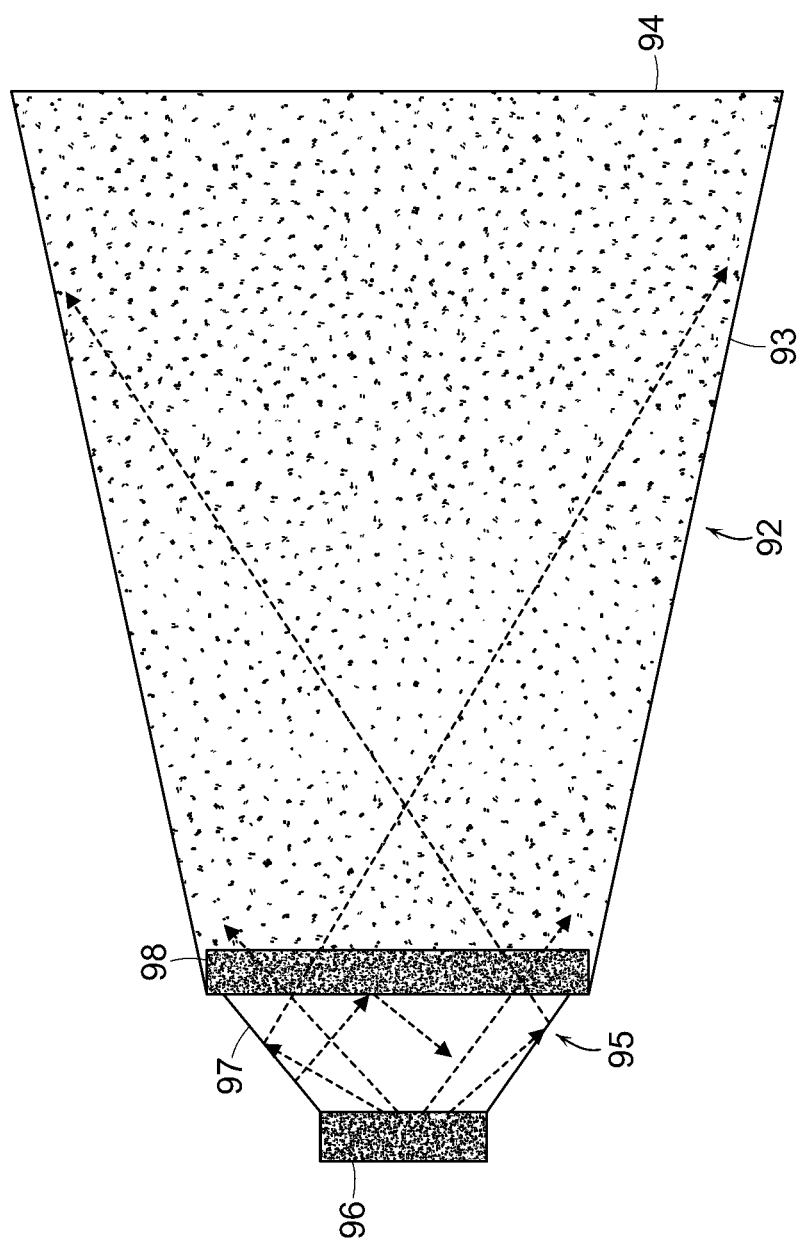
FIG. 15. is a single color or single wavelength light pipe in accordance with an exemplary embodiment of the present disclosure, employing a light pipe having an expanding or enlarging cross-sectional size in the downstream direction.

FIG. 15 illustrates a single color light pipe embodiment 92 in accordance with the present disclosure, having F2.4 light output. The light pipe 93 can be seen to be tapered, having an inside cross-sectional size which becomes larger toward the output port 94 of the light pipe. An axial injection port 95 comprises an LED light source 96 and an associated tapered feeder light pipe 97. As in other embodiments disclosed and discussed here, the lens system for collecting and passing light from the LED or other light source into the light pipe, may comprise a TIR, one or more lenses, a straight-wall or tapered light pipe or the like any combination of them. Optionally, stubs are employed in the injection port subassembly to provide recirculation for improved etendue. The LED itself in certain exemplary embodiments is sufficiently reflective to provide a useful level of recirculation of the emitted light. Light emitted by the LED light source passes into the light pipe through a angle-dependent, wavelength-selective pass filter 98, that is, through a filter which passes the emitted light at high angles of incidence, e.g., 60°-90°, and reflects such light at small angles of incidence, e.g., 0°-30°. Optionally, the angle-dependent, wavelength-selective pass filter can be positioned further downstream, typically, but not necessarily, retaining its orientation in a plane substantially normal to the longitudinal axis of light pipe. The light output of the light pipe is unpolarized, although a polarizer could be used instead of, or in series with, the angle-dependent, wavelength-selective pass filter. For example, a polarizer filter could be positioned at the outlet port of the light pipe (that is, at the extreme right end of the light pipe, as shown in FIG. 13), typically, but not necessarily, being oriented in a plane normal to the longitudinal axis of the light pipe.

As seen in many illustrated embodiments discussed above, at least one of the light injection ports may comprise a tapered light collector, which may in turn comprise a hollow light pipe fixedly integrated with the light pipe. In certain exemplary embodiments the light source assembly may employ a short wave pass filter as a horizontal angle-dependent, wavelength-selective pass filter positioned at the light entrance port into the light pipe. In certain embodiments the light source assembly a dichroic filter is positioned in the light pipe at a 30° to 60° angle to the axial optical pathway.

Certain embodiments of the light source assembly have a second light injection port or entrance located axially along the light pipe between the first light entrance or port and a third light port. The light source assembly further comprises a primary entrance filter positioned at the second light entrance in a plane generally parallel to the elongate axial optical pathway. The second light entrance filter is operative:
  a. to pass at least a second color light having an angle of incidence of from 0° to 30° upon the primary second light entrance filter, and
  b. to reflect at least
    i. the second color light having an angle of incidence of from 60° to 90° upon the primary second light entrance filter, and
    ii. first color light having an angle of incidence of from 0° to 30° upon the primary second light entrance filter.

The light source assembly of certain embodiments further comprises reflective surface area at the perimeter of at least one of the light entrances, which reflective surface areas are operative to provide recirculation of at least a portion of the light from the associated light source. Optionally, the second light collector increases in size toward an opening at the second light entrance into the light pipe, the opening of the light collector is larger than the second light entrance, and the reflective surface at the perimeter of the second light entrance is operative to reflect back at least a portion of the light from the second light source which does not pass through the primary second light entrance filter. In certain embodiments the light emitter is an LED, LCD or the like, which is itself somewhat reflective of the light it is emitting. The light source assemblies optionally further comprise a secondary second light entrance filter positioned in the axial optical pathway and optically between the second light entrance and the light port. The secondary second light entrance filter is operative to pass at least
  first color light having an angle of 0° to 30° to the axial optical pathway to the light port, and
  second color light having an angle of 0° to 30° to the axial optical pathway to the light port.

The secondary second light entrance filter is also operative in certain such embodiments to reflect at least second color light having an angle of 60° to 90° to the axial optical pathway to the light port.

In accordance with another aspect, a light source assembly further comprises at least one light valve positioned to receive light passed from the light pipe via the light port (i.e., at the front or output end), and at least one focusing relay lens positioned between the light port and the light valve and operative to focus light passed from the light pipe via the light port to the light valve.

Certain exemplary embodiments of the light source assemblies disclosed here further comprise a third tapered light collector at a third light entrance to the light pipe. Such third light entrance can be axially spaced from the first and second light entrances and located between the second light entrance and the optical port (i.e., output port of the light pipe). A third light source is operative to generate a third color light, different from the first and second color lights, into the light pipe via the third tapered light collector. The third tapered light collector is operative to reduce the angular distribution of the third color light entering the light pipe from the third light source. At least a second dichroic filter is positioned in the axial optical pathway optically between the second light entrance and the third light entrance, the second dichroic filter being operative to pass first and second color light from the first and second light sources, respectively, toward the light port and to reflect third color light from the third light source toward the light port. The light pipe is operative to homogenize the first, second and third color lights passed simultaneously into the light pipe from the first, second and third light sources, respectively. In certain exemplary embodiments such light source assemblies, the second dichroic filter is positioned in the light pipe at a 30° to 60° angle to the axial optical pathway.

Optionally such light source assemblies further comprise a primary second light entrance filter positioned at the second light entrance and a primary third light entrance filter positioned at the third light entrance in a plane generally parallel to the axial optical pathway. The primary second light entrance filter is positioned at the second light entrance in a plane generally parallel to the axial optical pathway. It is operative to pass at least second color light having an angle of incidence of from 0° to 30° upon the primary second light entrance filter, and to reflect at least second color light having an angle of incidence of from 60° to 90° upon the primary second light entrance filter, and first color light having an angle of incidence of from 0° to 30° upon the primary second light entrance filter. The primary third light entrance filter can be positioned at the third light entrance in a plane generally parallel to the axial optical pathway. It is operative to pass at least second color light having an angle of incidence of from 0° to 30° upon the primary second light entrance filter, and to reflect at least second color light having an angle of incidence of from 60° to 90° upon the primary second light entrance filter, and first color light having an angle of incidence of from 0° to 30° upon the primary second light entrance filter.

As noted above, the light source assembly may comprise a light pipe comprising a hollow elongate rectangular pipe segment extending from a first axial end of the rectangular pipe segment to the light port at a second axial end of the rectangular pipe segment. The first light entrance in certain exemplary embodiments is an axial entrance at the first axial end of the rectangular pipe segment, and the second light entrance is a lateral entrance through a side wall of the rectangular pipe segment. The third light entrance optionally is a lateral entrance through a side wall of the rectangular pipe segment. In some advantageous embodiments, the first light source comprises a green LED, the second light source comprises a blue LED, and the third light source comprises a red LED. In alternative embodiments the light source assembly has a green LED.

In certain exemplary embodiments of the light source assemblies disclosed here, at least one of the first and second tapered light collectors is an anamorphic collector or a focusing light collector operative to focus light from the associated light source into the light pipe. The light source assembly may employ a non-focusing light collector for at least one of the first and second tapered light collectors.

In certain exemplary embodiments of the light source assemblies disclosed here, the first dichroic filter comprises a thin film filter.

In accordance with certain exemplary embodiments, a light source assembly comprises, in combination:
  an light pipe forming at least a light port and an elongate axial optical pathway to the light port;
  a first tapered light collector;
  a first light source operative to generate a first color light into the light pipe at a first light entrance via the first tapered light collector, the first tapered light collector being operative to reduce the angular distribution of the first color light entering the light pipe from the first light source;
  a second tapered light collector;
  a second light source operative to generate a second color light, different from the first color light, into the light pipe via the second tapered light collector at a second light entrance axially spaced from the first light entrance, the second tapered light collector being operative to reduce the angular distribution of the second color light entering the light pipe from the second light source; and
  at least a first dichroic filter positioned in the light pipe optically between the first and second light entrances and operative as oriented in the light pipe
  to pass first color light from the first light source toward the light port, and
  to reflect second color light from the second light source toward the light port;
  wherein the light pipe is operative to homogenize the first and second color lights passed simultaneously to the light port from the first and second light sources, respectively.

The light source assemblies disclosed here are applicable to numerous different fields of use and to different applications within a field of use. Such different fields of use include medical applications for the light source assemblies, including, for example, spectroscopic (UV fluorescence) applications, e.g., medical diagnostics, environmental testing, chemical testing and processing, security detection, etc.

Figure 16:
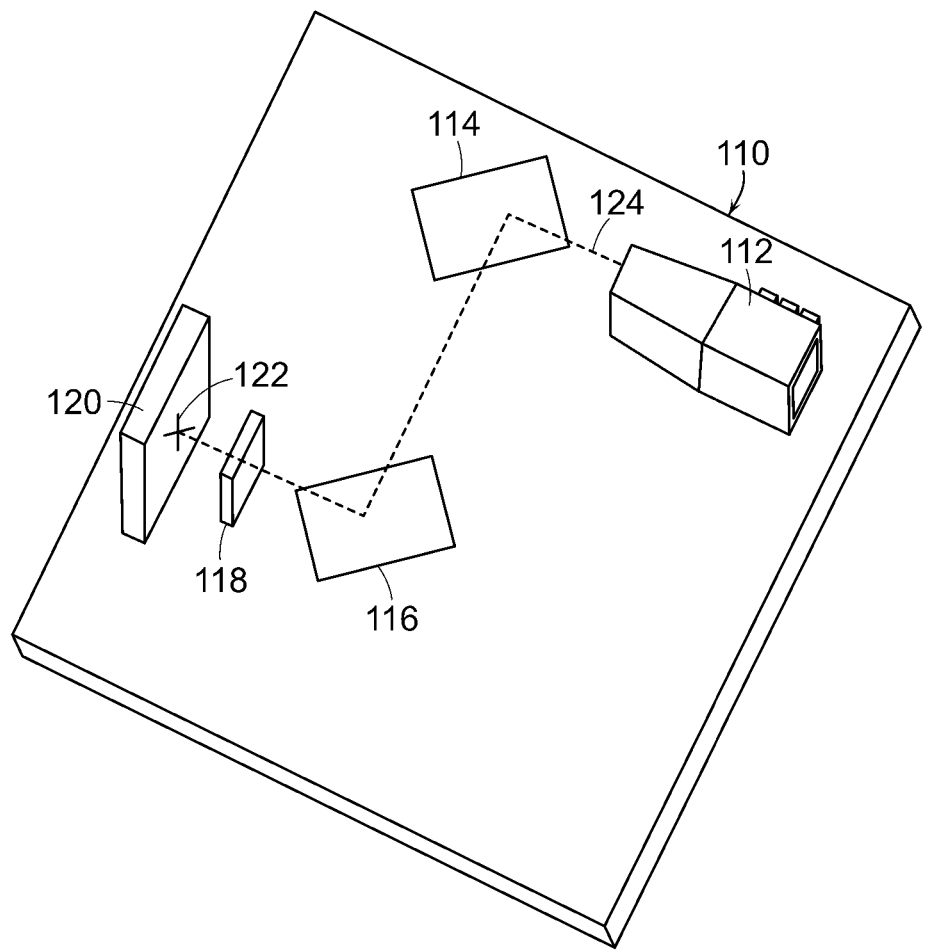
FIG. 16 is a simplified perspective illustration of a precision apparatus having features of the present invention.

Referring initially to FIG. 16, the present invention is directed to a precision apparatus 110 that, for example, can be used as or in optical communications, light projection systems, scientific instruments and manufacturing equipment. FIG. 16 is a simplified, non-exclusive, perspective view of one embodiment of the precision apparatus 110. In this embodiment, the precision apparatus 110 is a light projection system, commonly referred to as a Digital Mirror Device ("DMD system"). Alternatively, for example, the precision apparatus 110 can be another type of apparatus that uses a light beam. For example, the present invention can be used in another type of projection system such as a Liquid Crystal Display (LCD) system or a Liquid Crystal on Silicon (LCOS) system.

In FIG. 16, the precision apparatus 110 includes a light source assembly 112, a minor 114, an imager 116, a lens 118, and a screen 120 that cooperate to generate an image 122 (represented as an "X") on the screen 120. The design and orientation of the components of the precision apparatus 110 can be changed to suit the requirements of the precision apparatus 110. Further, the precision apparatus 110 can be designed with fewer or more components than those illustrated in FIG. 16.

The light source assembly 112 generates a light 124 for the projection system 110. As an overview, in certain embodiments, the light source assembly 112 generates a homogenized, incoherent bright white light 124 that includes blue light, green light and red light. As a result thereof, in certain embodiments, one or more components, such as a color wheel is not required for the DMD system. Further, in one embodiment, multiple light beams are multiplexed in a light pipe. With this design, the light source assembly 112 can be controlled to generate an output beam having any desired color, including red, blue, green or white.

Moreover, in certain embodiments, the light source assembly 112 can be designed to efficiently generate the light 124 with relatively low power. This reduces the amount of heat generated by the light source assembly 112 and improves the performance of the precision apparatus 110. Additionally, the light source assembly 112 has a relatively long operational lifespan, has good power stability, and is relatively small in size.

The mirror 114 reflects the light 124 exiting from the light source assembly 112 and directs the light 124 at the imager 116.

The imager 116 creates the image 122. In one embodiment, the imager 116 is a digital light processing chip that includes anywhere from approximately 800 to more than 1 million tiny mirrors that are individually controlled to generate the image 122. Alternatively, for example, the imager 122 can be a LCD imager or a LCOS imager.

The lens 118 collects the image 122 from the imager 116 and focuses the image 122 on the screen 120. The screen 120 displays the image 122.

Figure 17A:
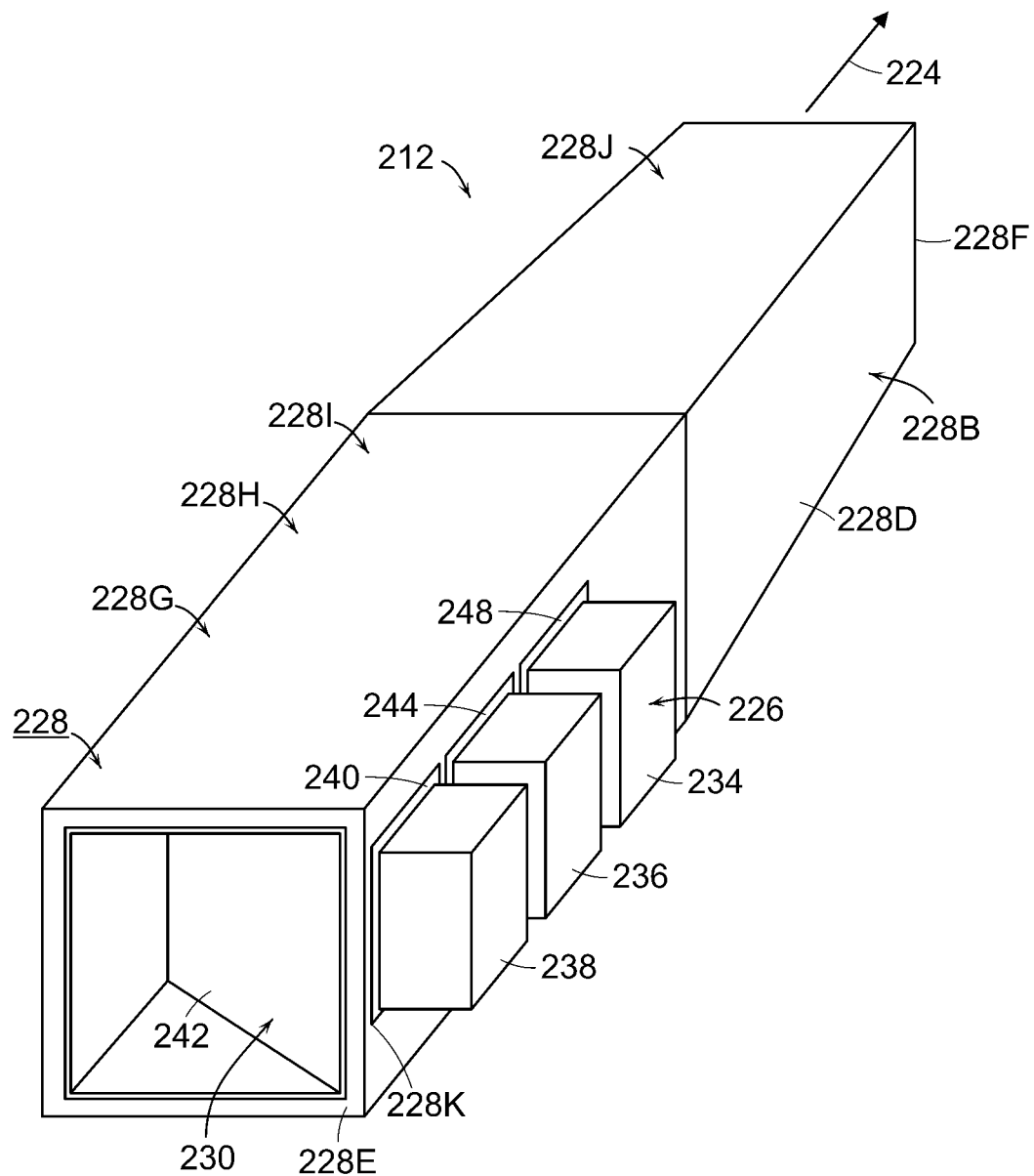
FIG. 17A is a perspective view of a light source assembly having features of the present invention.
Figure 17B:
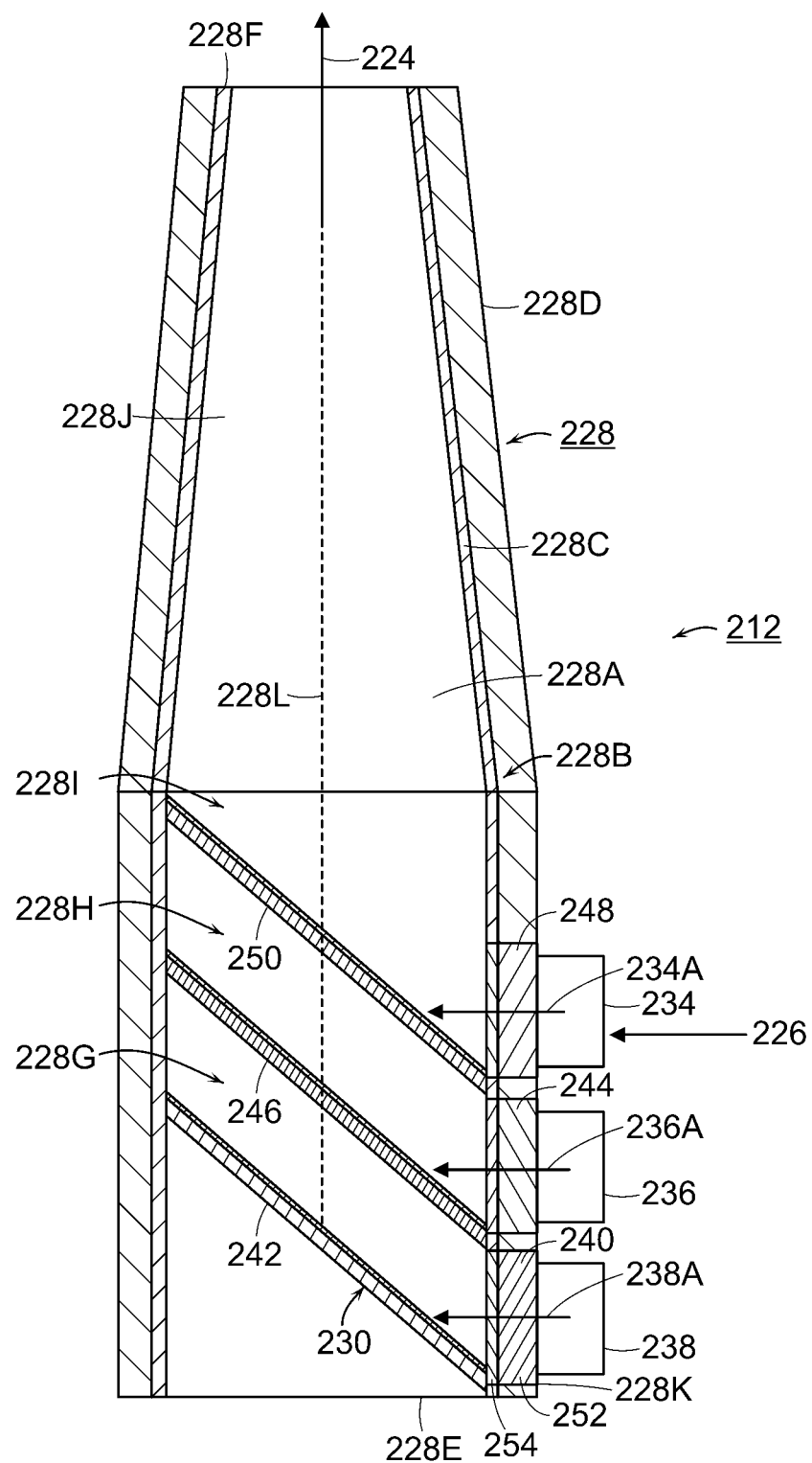
FIG. 17B is a cut-away view of the light source assembly of FIG. 17A.

FIG. 17A is a perspective view and FIG. 17B is a cut-away view of one embodiment a light source assembly 212 that can be used in a precision apparatus 110 (illustrated in FIG. 16). In this embodiment, the light source assembly 212 includes a plurality of light sources 226, an optical pipe 228, and a director assembly 230.

The number and design of the light sources 226 can be varied pursuant to the teachings provided herein. In one embodiment, the light source assembly 212 includes three separate light sources 226, namely a blue light source 234 (illustrated as a box) that generates blue light 234A (illustrated as an arrow), a green light source 236 (illustrated as a box) that generates green light 236A (illustrated as an arrow), and a red light source 238 (illustrated as a box) that generates red light 238A (illustrated as an arrow). The blue light 234A has a wavelength of between approximately 450-490 nm, the green light 236A has a wavelength of between approximately 490-570 nm, and the red light 238A has a wavelength of between approximately 630-700 nm. Alternatively, the light source assembly 212 could be designed with greater than or fewer than three light sources 236.

It should be noted that the blue light source 234, the green light source 236, and/or the red light source 238 can be referred to herein as the first light source, the second light source, or the third light source. Further, the blue light 234A, the green light 236A, and/or the red light 238A can be referred to herein as the first light, the second light, or the third light.

In one embodiment, each of the light sources 226 is a light emitting diode ("LED"). In this example, the blue light source 234 is a blue LED, the green light source 236 is a green LED, and the red light source 238 is a red LED. In one non-exclusive embodiment, the blue light source 234 has an output of between approximately 100 to 200 lumen, the green light source 236 has an output of between approximately 900 to 1100 lumen, and the red light source 238 has an output of between approximately 300 to 500 lumen. Alternatively, each of the light sources 234, 236, 238 can be designed to have an output that is greater or lesser than the amounts described above.

In one embodiment, each of light sources 234, 236, 238 is turned on and off is sequence. As a result thereof, a color wheel (not shown) may not be necessary for a DMD system. This allows for a smaller form factor for the DMD system and can reduce the cost for assembly of the DMD system. Moreover, the LED's have a relatively long operational lifespan. Alternatively, the light sources 234, 236, 238 can be maintained on and a color wheel can be utilized. Further, the light sources 234, 236, 238 can be controlled to generate an output light 224 having any desired color, including red, blue, green or white.

The optical pipe 228 captures the lights 234A, 236A, 238A and homogenizes the lights 234A, 236A, 238A so that the light 224 exiting the light source assembly 212 is uniform, consistent, and has the desired aspect ratio. Optical pipes are also sometimes referred to as light tunnels or tunnel integrators. The design of the optical pipe 228 can be varied pursuant to the teachings provided herein. FIGS. 17A and 17B illustrate a first embodiment of the optical pipe 228. In this embodiment, the optical pipe 228 is generally rectangular tube shaped and defines a generally rectangular shaped pipe passageway 228A.

Further, in this embodiment, the pipe passageway 228A (i) is substantially linear and includes a substantially linear passageway axis 228L, (ii) does not include any bends, and (iii) the light 234A, 236A, 238A from the light sources 234, 236, 238 travel down the same pipe passageway 228A. As a result of this design, in certain embodiments, the profile of the light source assembly 212 can be relatively small. Alternatively, pipe passageway 228A can include one or more bends. For Example, the pipe passageway 228A can include one or more 90 degree bends.

In one embodiment, the optical pipe 228 includes a generally rectangular tube shaped pipe body 228B and a wall coating 228C that define the generally rectangular shaped pipe passageway 228A. The pipe body 228B can include four walls 228D, with each of the walls 228D having an interior wall surface and an exterior wall surface. The four walls 228D can be referred to as a top wall, a bottom wall, a left wall, and a right wall for convenience. Alternatively, for example, the pipe body 228B can have another configuration, such as a circular shaped tube, an octagon shaped tube, or a triangular shaped tube for example.

In one embodiment, the interior wall surfaces are coated with the wall coating 228C. For example, the wall coating 228C can have a relatively high reflectivity for the visible wavelength range (approximately 400-750 nm). With this design, the wall coating 228C inhibits the light 224 from exiting the pipe passageway 228A and homogenizes the light 224. Suitable wall coatings 228C can include dielectric materials and/or metal (silver or aluminum) material.

The wall coating 228C may have to be applied with multiple coating layers, and can be deposited using a number of different methods including physical vapor deposition such as ion beam sputtering, magnetron sputtering, and ion assisted evaporation. One method for depositing a coating is disclosed in U.S. Pat. No. 6,736,943, the contents of which are incorporated herein by reference.

Moreover, in this embodiment, the optical pipe 228 includes (i) a leading edge 228E, (ii) an opposed trailing edge 228F (sometimes referred to as the "output end") that faces the minor 114 (illustrated in FIG. 16), (iii) a red region 228G, (iv) a green region 228H, (v) a blue region 228I, and (vi) a homogenizing region 228J. The design and location of each of these regions 228B-228E can be varied pursuant to the teachings provided herein.

The red light 238A is directed into the optical pipe 228 at the red region 228G, the green light 236A is directed into the optical pipe 228 at the green region 228H, and the blue light beam 234A is directed into the optical pipe 228 at the blue region 228I. In FIGS. 17A and 17B, the red region 228G, the green region 228H, and the blue region 228I is each generally rectangular tube shaped and each includes a region aperture 228K (e.g. a port) that receives a portion of the director assembly 230 and that extends through the front wall 228D. Alternatively, one or more of these regions 228G-228I can have another configuration. It should be noted that the red region 228G, the green region 228H, and/or the blue region 228I can be referred to herein as the first region, the second region, or the third region. Further, the region apertures 228K are spaced apart And can be referred to as the first inlet port, the second inlet port, the third inlet. Further, the region aperture 228K in the red region 228G can be referred to as the red inlet port, the region aperture 228K in the green region 228H can be referred to as the green inlet port, and the region aperture 228K in the blue region 228I can be referred to as the blue inlet port.

The homogenizing region 228J homogenizes the light 234A, 236A, 238A that travel down the pipe passageway 228A. In FIGS. 17A and 17B, the homogenizing region 228J is generally tapered rectangular tube shaped and the light 234A, 236A, 238A from each of the sources travels down the same path. As a result thereof, the light 224 is generally rectangular shaped. Alternatively, the homogenizing region 228J can have another configuration to suit the desired aspect ratio of the light beam 224.

In FIGS. 17A and 17B, the red region 228G, the green region 228H, the blue region 228I, and the homogenizing region 228J are illustrated as a continuous piece. Alternatively, one or more of these regions 228G-228J can be made separately and subsequently attached to the other regions 228G-228J.

Moreover, in FIGS. 17A and 17B, moving from the leading edge 228E to the trailing edge 228F the regions are organized as the red region 228G, the green region 228H, the blue region 228I, and the homogenizing region 228J. In this embodiment, moving from the leading edge 228E to the trailing edge 228F, the regions 228G, 228H, 228I are organized so that the longest wavelength light enters the pipe passageway 238A closest to the leading edge 228E and the shortest wavelength light enters the pipe passageway 238A closest to the trailing edge 228F. Stated in another fashion, moving from the leading edge 228E to the trailing edge 228F, the light sources 234, 236, 238 are organized so that the light enters the pipe passageway 238A from longest wavelengths to the shortest wavelengths. With this design, the red light 238A enters the pipe passageway 238A closest to the leading edge 228E, the blue light 234A enters the pipe passageway 238A closest to the trailing edge (exit) 228F, and the green light 236A enters the pipe passageway 238A intermediate where the red light 238A and the blue light 234A enters the pipe passageway 238A. This simplifies the design of one or more of the filters of the director assembly 230. Alternatively, the orientation of the red region 228G, the green region 228H, and the blue region 228I can be different than that illustrated in the Figures.

The director assembly 230 allows the desired light to enter the pipe passageway 228A and directs the desired light down the pipe passageway 228A. The design of the director assembly 230 can vary pursuant to the teachings provided herein. In FIGS. 17A and 17B, the director assembly 230 includes (i) a red pass filter 240, (ii) an end reflector 242, (iii) a green pass filter 244, (iv) a green Dichroic filter 246, (v) a blue pass filter 248, and (vi) a blue Dichroic filter 250. Alternatively, the director assembly 230 could be designed to have more components or fewer components than those illustrated in FIGS. 17A and 17B.

It should be noted that the red pass filter 240, the green pass filter 244, and/or the blue pass filter 248 can be referred to as a first pass filter, a second pass filter, or a third pass filter. These pass filters 240, 244, 248 keep light that has entered the pipe passageway 228A in the pipe passageway 228A to enhance the efficiency of the assembly. It should also be noted that the green Dichroic filter 246 or the blue Dichroic filter 250 can be referred to as a first Dichroic filter or a second Dichroic filter.

The red pass filter 240 is positioned between the red light source 238 and the pipe passageway 228A, allows red light 238A from the red light source 238 to enter the pipe passageway 228A, and inhibits red light 238A in the pipe passageway 228A from exiting via the red pass filter 240. In one embodiment, the red pass filter 240 is capable of (i) transmitting a high percentage of red light that is within a red predetermined angle of incidence range, (ii) reflecting a high percentage red light that is outside the red predetermined angle of incidence range, (iii) reflecting a high percentage of blue light, and (iv) reflecting a high percentage of green light. In alternative, non-exclusive embodiments, the red predetermined angle of incidence range is between approximately 0 to 50; 0 to 45; 0 to 30; 0 to 20; 0 to 10; or 0 to 5 degrees.

Further, in alternative, non-exclusive embodiments, the phrase "transmitting a high percentage" shall mean an average transmittance of greater than approximately 85, 90, 95, 96, 97, 98, or 99. Moreover, in alternative, non-exclusive embodiments, phrase "reflecting a high percentage" shall mean an average reflection of greater than approximately 85, 90, 95, 96, 97, 98, or 99.

In FIGS. 17A and 17B, the red pass filter 240 is positioned in the region aperture 228K in the wall 228D of the pipe body 228B at the red region 228G. In one embodiment, the red pass filter 240 is generally rectangular plate shaped and fits into the rectangular shaped region aperture 228K. Alternatively, the red pass filter 240 can have another configuration. As illustrated in FIG. 17B, in one embodiment, the red light 238A is directed into the pipe passageway 228A substantially transverse to the passageway axis 228L of the pipe passageway 228A. As used herein, the term transverse shall mean at an angle relative to the passageway axis. For example, the red light 238A can be directed into the pipe passageway 228A at an angle of approximately 90 degrees relative to the passageway axis 228L. Alternatively, the red light 238A can be directed into the pipe passageway 228L at angles other than 90 degrees.

The end reflector 242 reflects the red light 238A and directs the red light 238A along the pipe passageway 228A. In FIGS. 17A and 17B, the end reflector 242 extends across the pipe passageway 228A at an angle (e.g. approximately 45 degrees in one embodiment) and reflects substantially all light that is within the visible wavelengths towards the trailing edge 228E. Additionally, the end reflector 242 is positioned at the edge of the red region 228G. In one embodiment, the end reflector 242 is generally rectangular plate shaped and has a size and shape that corresponds to that of the pipe passageway 228A.

The green pass filter 244 is positioned between the green light source 236 and the pipe passageway 228A, allows green light 236A from the green light source 236 to enter the pipe passageway 228A, and inhibits green light 236A and red light 238A in the pipe passageway 228A from exiting via the green pass filter 244. In one embodiment, the green pass filter 244 is capable of (i) transmitting a high percentage of green light that is within a green predetermined angle of incidence range, (ii) reflecting a high percentage green light that is outside the green predetermined angle of incidence range, (iii) reflecting a high percentage of blue light, and (iv) reflecting a high percentage of red light. In alternative, non-exclusive embodiments, the green predetermined angle of incidence range is between approximately 0 to 50; 0 to 45; 0 to 30; 0 to 20; 0 to 10; or 0 to 5 degrees.

In FIGS. 17A and 17B, the green pass filter 244 is positioned in the region aperture 228K in the wall 228D of the pipe body 228B at the green region 228H. In one embodiment, the green pass filter 244 is generally rectangular plate shaped and fits into the rectangular shaped region aperture 228K. Alternatively, the green pass filter 244 can have another configuration. As illustrated in FIG. 17B, in one embodiment, the green light 236A is directed into the pipe passageway 228A substantially transverse to the passageway axis 228L. For example, the green light 236A can be directed into the pipe passageway 228A at an angle of approximately 90 degrees relative to the passageway axis 228L. Alternatively, the green light 236A can be directed into the pipe passageway 228L at angles other than 90 degrees.

The green dichroic filter 246 reflects the green light 236A and directs the green light 236A along the pipe passageway 228A while allowing red light 238A to pass therethrough. In FIGS. 17A and 17B, the green dichroic filter 246 extends across the pipe passageway 228A at an angle (e.g. approximately 45 degrees in one embodiment) and reflects substantially all green light 236A towards the trailing edge 228E. Additionally, the green dichroic filter 246 is positioned between the red region 228G and the green region 228H. In one embodiment, the green dichroic filter 246 is generally rectangular plate shaped and has a size and shape that corresponds to that of the pipe passageway 228A.

The blue pass filter 248 is positioned between the blue light source 234 and the pipe passageway 228A, allows blue light 234A from the blue light source 234 to enter the pipe passageway 228A, and inhibits blue light 234A, green light 236A, and red light 238A in the pipe passageway 228A from exiting via the blue pass filter 248. In one embodiment, the blue pass filter 248 is capable of (i) transmitting a high percentage of blue light that is within a blue predetermined angle of incidence range, (ii) reflecting a high percentage blue light that is outside the blue predetermined angle of incidence range, (iii) reflecting a high percentage of green light, and (iv) reflecting a high percentage of red light. In alternative, non-exclusive embodiments, the blue predetermined angle of incidence range is between approximately 0 to 50; 0 to 45; 0 to 30; 0 to 20; 0 to 10; or 0 to 5 degrees.

In FIGS. 17A and 17B, the blue pass filter 248 is positioned in the region aperture 228K in the wall 228D of the pipe body 228B at the blue region 228I. In one embodiment, the blue pass filter 248 is generally rectangular plate shaped and fits into the rectangular shaped region aperture 228K. Alternatively, the blue pass filter 248 can have another configuration. As illustrated in FIG. 17B, in one embodiment, the blue light 234A is directed into the pipe passageway 228A substantially transverse to the passageway axis 228L. For example, the blue light 234A can be directed into the pipe passageway 228A at an angle of approximately 90 degrees relative to the passageway axis 228L. Alternatively, the blue light 234A can be directed into the pipe passageway 228L at angles other than 90 degrees.

The blue dichroic filter 250 reflects the blue light 234A and directs the blue light 234A along the pipe passageway 228A while allowing red light 238A and green light 236A to pass therethrough. In FIGS. 17A and 17B, the blue dichroic filter 250 extends across the pipe passageway 228A at an angle (e.g. approximately 45 degrees in one embodiment) between the green inlet port and the blue inlet port, and reflects substantially all blue light 234A towards the trailing edge 228E. Additionally, the blue dichroic filter 250 is positioned between the green region 228H and the blue region 228I. In one embodiment, the blue dichroic filter 250 is generally rectangular plate shaped and has a size and shape that corresponds to that of the pipe passageway 228A.

Further, in one embodiment, the green dichroic filter 246 and the blue dichroic filter 250 are arranged in series along the linear passageway axis 228L. This can reduce the footprint of the light source assembly 212. Moreover, one or both of the dichroic filters 246, 250 can have a high effective index (n greater than approximately 1.75) to provide improved response for the tilted coatings. As described above, each dichroic filter 246, 250 can be a plate type filter. In one embodiment, a plate type filter is an interference filter deposited onto a parallel plate substrate (e.g. glass). The plate type dichroic filter may be designed to have a high effective refractive index to improve filter response when tilted at angles to incident light.

The design of each of the red pass filter 240, the end reflector 242, the green pass filter 244, the green Dichroic filter 246, the blue pass filter 248, and the blue Dichroic filter 250 can be varied pursuant to the teachings provided herein. In one embodiment, each of the components includes a substrate 252 and coating 254 that coats the substrate 252. As an example, the substrate 252 can be a piece of glass or other transparent material. The coating 254 for each of the components is uniquely designed to achieve the desired level of reflectance for each of these components. Suitable coatings 254 can include dielectric materials and/or metal (silver or aluminum) material. The coatings 254 may have to be applied with multiple coating layers, and can be deposited using a number of different methods including physical vapor deposition such as ion beam sputtering, magnetron sputtering, and ion assisted evaporation. One method for depositing the coatings 254 is disclosed in U.S. Pat. No. 6,736,943.

In one embodiment, each of the pass filters 240, 244, 248 is built as an edge filter using thin film interference technology. The edge filter is designed to transmit at normal incidence (perpendicular to the filter) or near-normal incidence at the desired pass color (wavelength) while reflecting all other colors. Furthermore, the filter also reflects the desired color at non-normal angles. This is done using the angle shifting properties of thin films where at high angles, the edge, reflection bands and passbands of the filter shifts to shorter wavelengths. The shifting of the reflection bands provides the desired effect of having the same color which transmits at normal to be substantially reflected at non-normal wavelengths. Using these techniques, the pass filters 240, 244, 248 can also be designed to transmit a wavelength at normal (perpendicular to the filter), and reflect the wavelength at relatively high angles.

Figure 18:
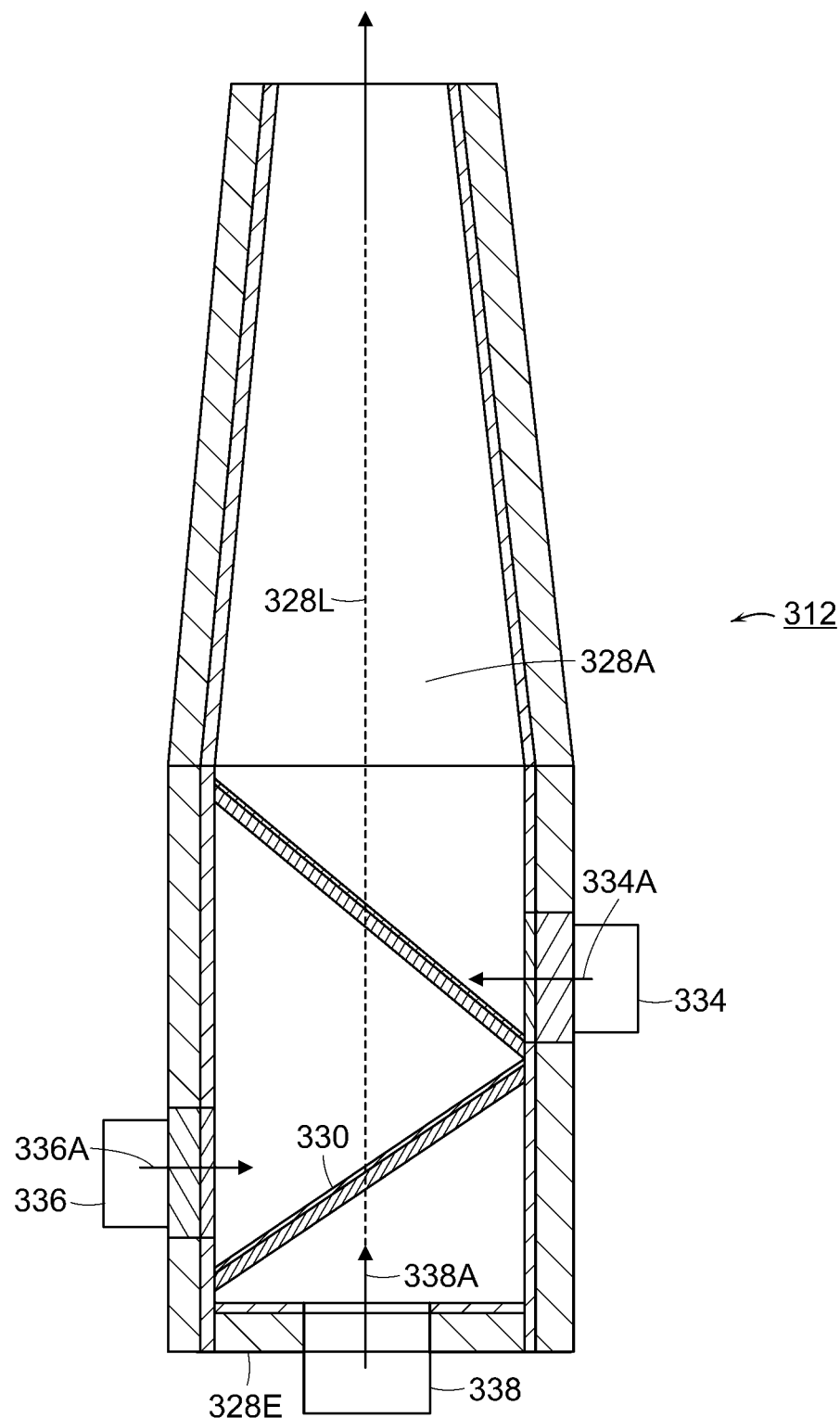
FIG. 18 is a cut-away view of another embodiment of a light source assembly having features of the present invention.

FIG. 18 is a cut-away view of another embodiment of a light source assembly 312 that is somewhat similar to the light source assembly 212 illustrated in FIGS. 17A and 17B and described above. However, in this embodiment, the red light source 338 is are located at the leading edge 328E and the red light source 338 directs the red light 338A along the passageway axis 328L. Moreover, the director assembly 330 does not include the end reflector 242 because in this configuration, there is no need to redirect the red light 338A. Additionally, this design does not include the red pass filter because the red light 338A enters the pipe passageway 328 along the passageway axis 328L and very little red light 338A is reflected back at the red light source 338.

Furthermore, in FIG. 18, the green light source 336 and the blue light source 334 are located in alternative sides of the passageway axis 328L. With this design, the blue light 334A and the green light 336A enter the pipe passageway 328A at an angle (perpendicular in one example) relative to the passageway axis 328L and the red light 338A enters the pipe passageway 328A aligned (parallel) with the passageway axis 328L. Stated in another fashion, in one embodiment, the red light 338A enters the pipe passageway 328A at an angle of approximately 90 degree angle relative to the blue light 334A and the green light 336A, and the green light 336A enters the pipe passageway 328A at an angle of approximately 180 degree angle relative to the blue light 334A. However, other angles can be utilized.

Figure 19:
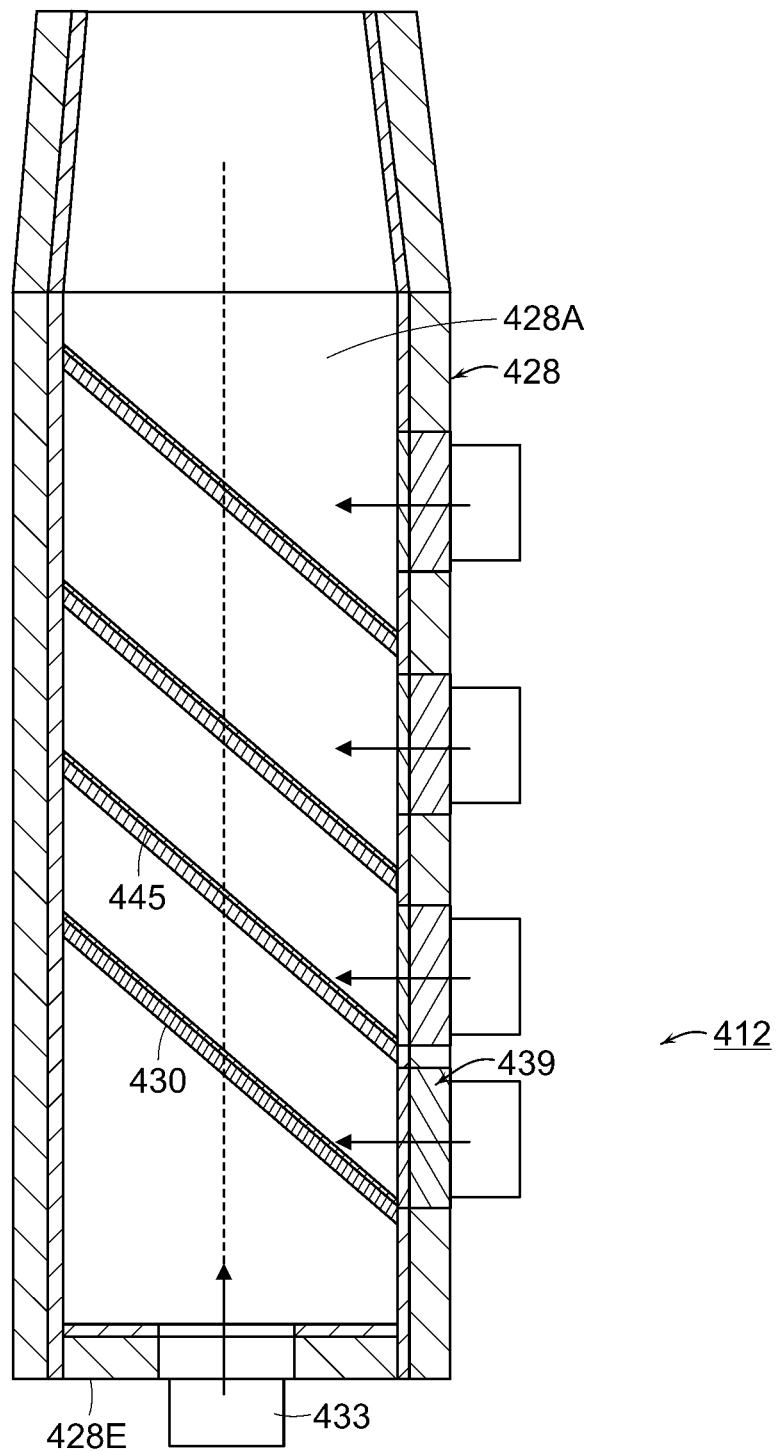
FIG. 19 is a cut-away view of yet another embodiment of a light source assembly having features of the present invention.

FIG. 19 is a cut-away view of yet another embodiment of a light source assembly 412 including an optical pipe 428, five spaced apart light sources 433 and the director assembly 430 include four pass filters 439 and four dichroic filters 445. In this embodiment, extra colors can improve color and brightness of the light source assembly 412. Alternatively, the light source assembly 412 could be designed with greater than or fewer than five spaced apart light sources 433 and/or greater than or fewer than four pass filters 439 and four dichroic filters 445.

In one embodiment, the light sources 433 include a red LED, a magenta LED, a green LED, a cyan LED, and a blue LED. Alternatively, other colors can be utilized.

In one embodiment, moving from the leading edge 428E to the trailing edge (not shown in FIG. 19), the light sources 433 can be are organized so that the light enters the pipe passageway 428A from longest wavelengths to the shortest wavelengths.

Figure 20:
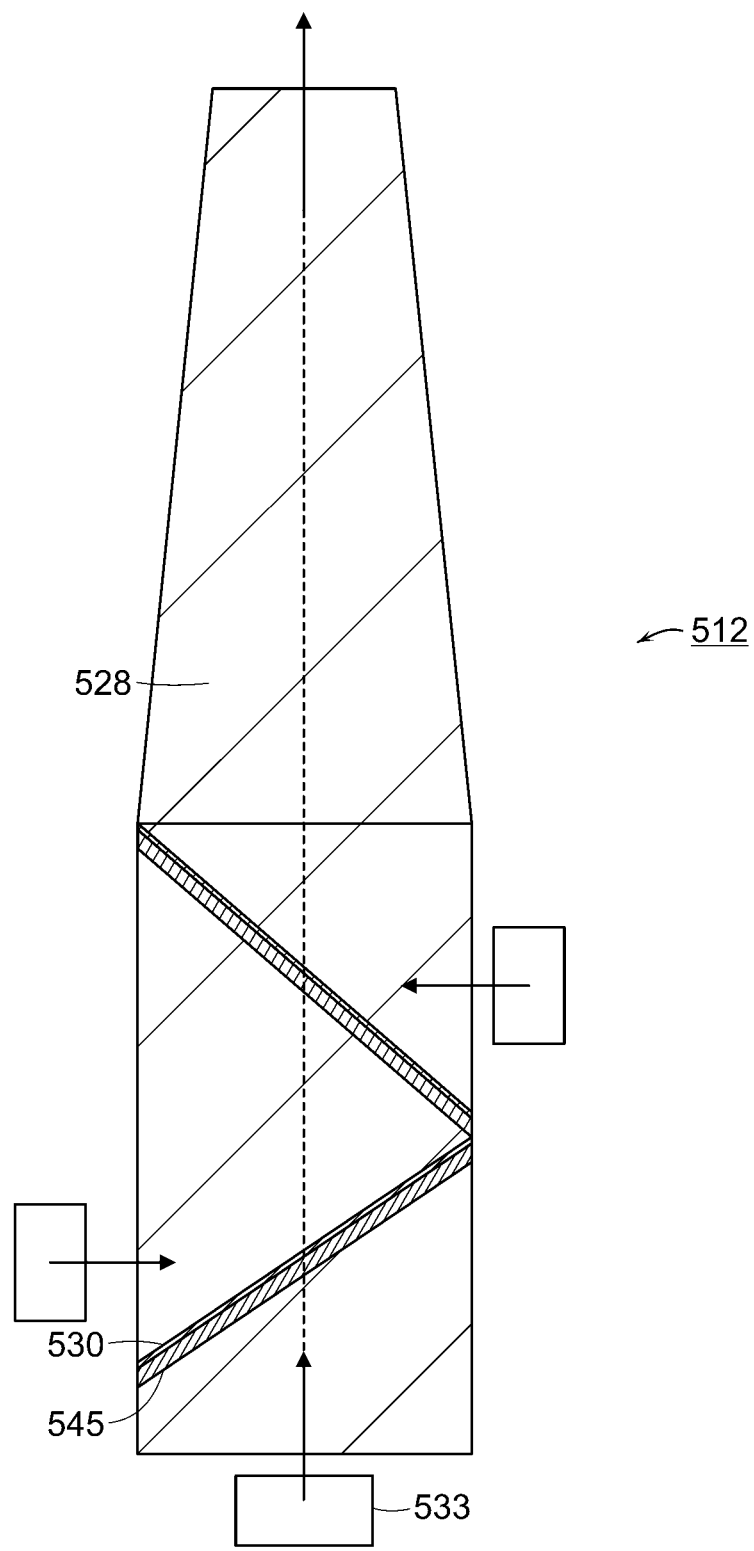
FIG. 20 is a cut-away view of still another embodiment of a light source assembly having features of the present invention.

FIG. 20 is a cut-away view of still another embodiment of a light source assembly 512 that includes the optical pipe 528 and three light sources 533. In this embodiment, the optical pipe 528 is a solid light pipe. For example, the optical pipe 528 can be a polished, rectangular shaped piece of glass or other material. Further, in the embodiment, the director assembly 530 includes two dichroic filters 545 that are embedded into the optical pipe 528. The dichroic filters 545 can be molded with the optical pipe 528.

Additionally, in this embodiment, the director assembly 530 does not include any pass filters. More specifically, in this embodiment, light that enters the solid light pipe continues to travel in the light pipe using total internal reflection. Alternatively, one or more pass filters can be used that function as an anti-reflection coating at normal and a reflector at high angles.

In FIG. 20, the light sources 533 are illustrated as being spaced apart from the optical pipe 528. Alternatively, the light sources 533 can be positioned against the optical pipe 528 and fixedly secured to the optical pipe 528.

Figure 21:
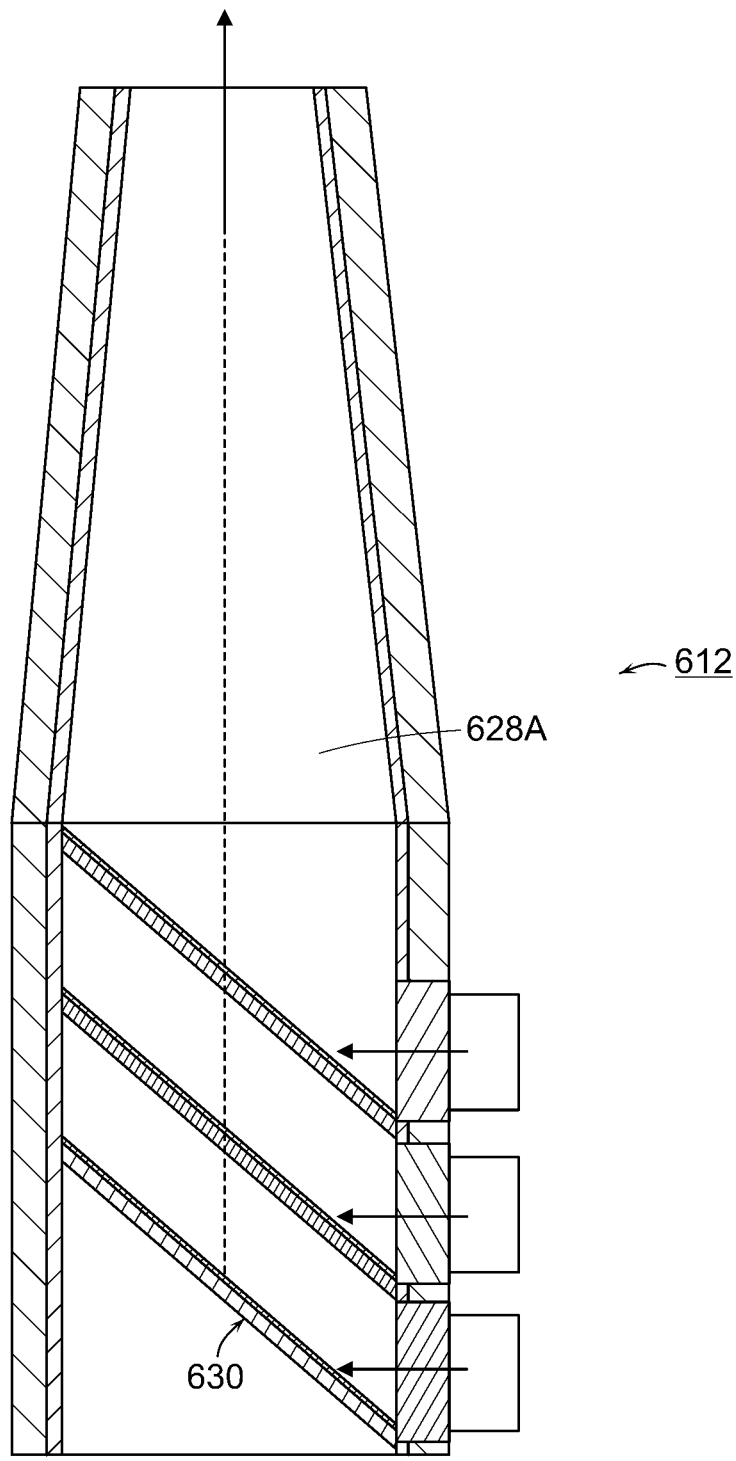
FIG. 21 is a cut-away view of another embodiment of a light source assembly having features of the present invention.

FIG. 21 is a cut-away view of another embodiment of a light source assembly 612 that is somewhat similar to the light source assembly 212 illustrated in FIGS. 17A and 17B and described above. However, in this embodiment, the director assembly 630 is slightly different. More specifically, in this embodiment, the director assembly 630 does not include (i) the red pass filter 240 (illustrated in FIG. 17B), (ii) the green pass filter 244 (illustrated in FIG. 17B), or (iii) the blue pass filter 248 (illustrated in FIG. 17B). In this embodiment, the pass filters 240, 244, 248 have been replaced with a transparent material such as glass. Alternatively, the ports can be open.

Figure 22:
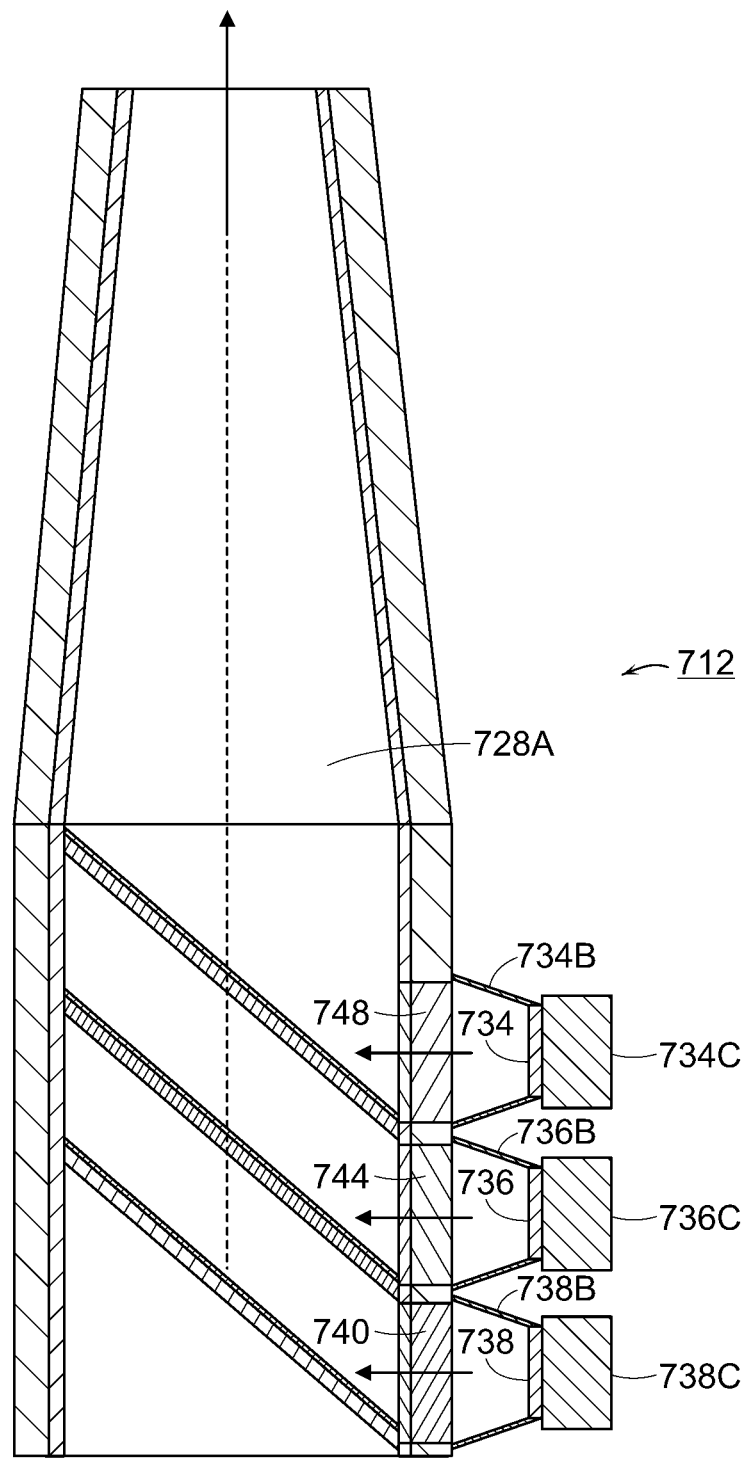
FIG. 22 is a cut-away view of yet another embodiment of a light source assembly having features of the present invention.

FIG. 22 is a cut-away view of another embodiment of a light source assembly 712 that is somewhat similar to the light source assembly 212 illustrated in FIGS. 17A and 17B and described above. However, in this embodiment, the light source assembly 712 includes (i) a blue collimator 734B positioned between the blue light source 734 and the blue pass filter 248, (ii) a blue heat sink 734C that cools the blue light source 734, (iii) a green collimator 736B positioned between the green light source 736 and the green pass filter 244, (iv) a green heat sink 736C that cools the green light source 736, (v) a red collimator 738B positioned between the red light source 738 and the red pass filter 740, and (vi) a red heat sink 738C that cools the red light source 738. Alternatively, the light source assembly 712 could be designed without one or more of the collimators and/or the heat sinks.

Each collimator 734B, 736B, 738B collimates the light from the respective light source 734, 736, 738 so that the light entering the pipe passageway 728A is largely collimated. The design of each collimator 734B, 736B, 738B can vary. In one embodiment, each of the collimators 734B, 736B, 738B is tapered light pipe collimator. Alternatively, one or more of the collimators 734B, 736B, 738B can be a lens type collimator Or a total internal reflection type collimator.

Each heat sink 734C, 736C, 738C removes heat from the respective light source 734, 736, 738. The design of each heat sink 734C, 736C, 738C can vary. In one embodiment, the heat sink 734C, 736C, 738C can include a plurality of spaced apart fins.

Further, in the embodiment illustrated in FIG. 22, the pipe passageway 728A has a slightly different shape than that illustrated in FIGS. 17A and 17B. In particular, in the embodiment, the pipe passageway 728A is not tapered.

It should be noted that one or more of the collimators 734B, 736B, 738B and/or one or more of the heat sinks 734C, 736C, 738C can be incorporated into one or other embodiments described or illustrated herein.

Figure 23A:
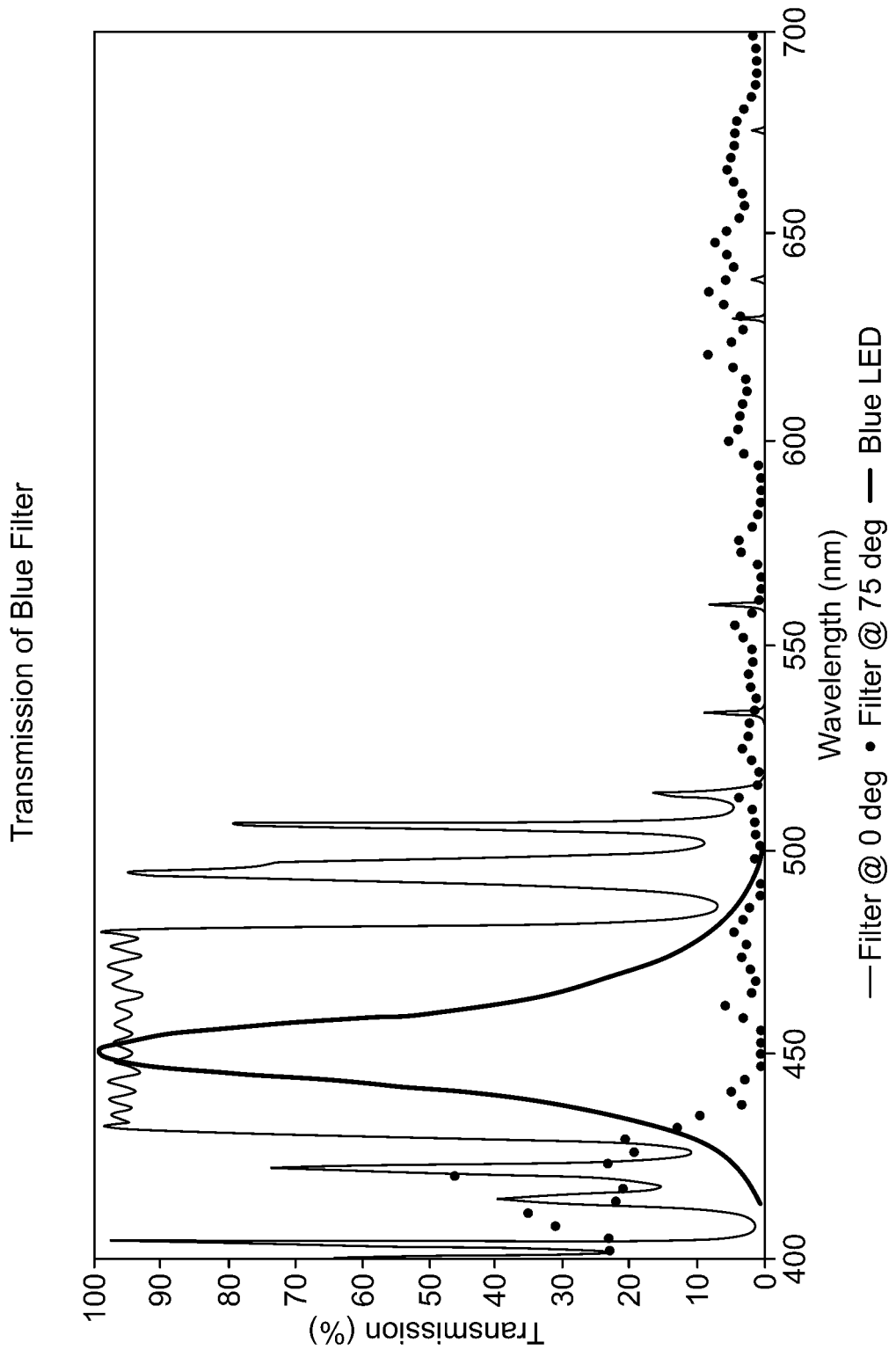
FIGS. 23A and 23B are alternative graphs that illustrate the properties of alternative pass filters having features of the present invention.
Figure 23B:
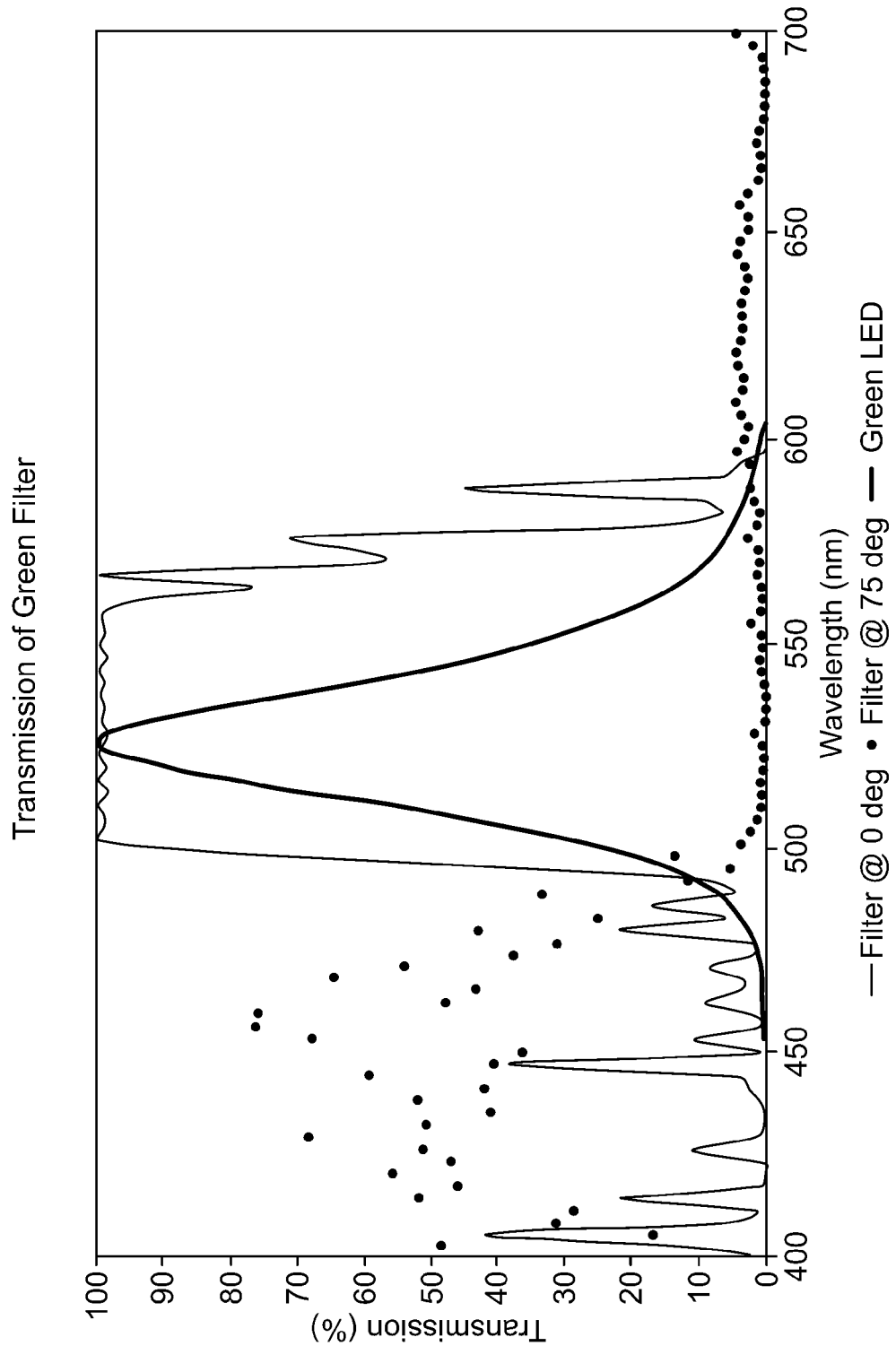

FIGS. 23A and 23B are alternative graphs that illustrate the properties of alternative pass filters in more detail. In particular, FIG. 23A is a graph that illustrates the properties of one embodiment of the blue pass filter, and FIG. 23B is a graph that illustrates the properties of one embodiment of the green pass filter. It should be noted that the coating could be designed to have other characteristics than that illustrated in FIGS. 23A and 23B.

FIG. 24 is a chart that lists the layer of materials used for making a one embodiment of a blue pass filter. Starting with the substrate, the layers of materials (detail in FIG. 24) are deposited. The thickness of each layer is in nanometers.

While the particular apparatus 110 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

Those of ordinary skill in the art will recognize that the light source assemblies disclosed here present significant technical and commercial advantages. Likewise, those of ordinary skill in the art will recognize that innumerable modifications can be made and other features are aspect added without departing from the principles disclosed here.

We claim:

1. A light source assembly comprising, in combination;
   a) a primary light pipe forming at least a fight port and elongate axial pathway from at least first and second light entrances to the light port, the second light entrance being axially spaced a along the primary light from the first light entrance;
   b) at least first and second light feeds for respectively feeding light of a first colour into said primary light pipe via said first light entrance and feeding light of a second colour into said primary light pipe via second light entrance; and
   c) at least a first dichroic filter positioned in the primary light pipe optically between the first and second light entrances and operative as oriented in the primary light pipe to pass said light of said first colour entering said primary light pipe via said first light entrance toward the light port, and to reflect said light of said second colour entering said primary light pipe via said second light entrance toward the light port,
   further comprising an angle-dependent, wavelength-selective pass filter in respect of at least one of said light entrances, said filter being operative to be transmissive of light of at least the colour associated with the respective light entrance within a first angle of incidence range, and reflective of the same light within a second angle of incidence range.

2. A light assembly according to claim 1, wherein said at least one angle-dependent, wavelength-selective pass filter is positioned substantially parallel to said axial optical pathway across the respective light entrance, such that said first angle of incidence range is relatively low and corresponds to the angle of incidence range at which the corresponding light is fed into the primary light pipe.

3. A light source assembly according to claim 1, wherein said first angle of incidence range is 0-30°.

4. A light source assembly according to claim 3, wherein said second angle of incidence range is 60-90°.

5. A light source assembly comprising, in combination:
   a) a primary light pipe forming at least a light port and an elongate axial pathway from at least first and second light entrances to the light port, the second light entrance being axially spaced along the primary light pipe from the first light entrance;
   b) at least first and second light feeds for respectively feeding light of a first colour into said primary light pipe via said first light entrance and feeding light of a second colour into said primary light pipe via said second light entrance; and
   c) at least a first dichroic filter positioned in the primary light pipe optically between the first and second light entrances and operative as oriented in the primary light pipe to pass said light of said first colour entering said primary light pipe via said first light entrance toward the light port, and to reflect said light of said second colour entering said primary light pipe via second light entrance toward the light port, wherein said dichroic filter is oriented at an angle to said axial optical pathway, and wherein at least one angle-dependent, wavelength selective pass filter is positioned within said primary light pipe, substantially perpendicular to the axial optical pathway.

6. A light source assembly comprising, in combination:
 a) a primary light pipe forming at least a light port and an elongate axial pathway from at least first and second light entrances to the light port, the second light entrance being axially spaced along the primary light pipe from the first light entrance;
 b) at least first and second light feeds for respectively feeding light of a first colour into said primary light pipe via said first light entrance and feeding light of a second colour into said primary light pipe via said second light entrance; and
 c) at least a first dichroic filter positioned in the primary light pipe optically between the first and second light entrances and operative as oriented in the primary light pipe to pass said light of said first colour entering said primary light pipe via said first light entrance toward the light port, and to reflect said light of said second colour entering said primary light pipe via said second light entrance toward the light port, comprising at least three light entrances to the light port, first, second and third light feeds for respectively feeding light of a first colour into said primary light pipe via a first light entrance, feeding light of a second colour into said primary light pipe via a second light entrance and feeding light of a third colour into said primary light pipe via a third light entrance, wherein said first light entrance is located at an opposing end of said primary light pipe to the light port, and the second and third light entrances are axially spaced along said primary light pipe from said first light entrance and from each other.

7. A light source assembly according to claim 6, wherein said primary light pipe is operative to homogenize said first, second and third colour light passed simultaneously to the light port from said first, second and third feeds respectively.

8. A light source assembly according to claim 6, further comprising at least a second dichroic filter positioned in the primary light pipe optically between the second and third light entrances and operative as oriented in the primary light pipe to pass said light of said second colour entering said primary light pipe via said second light entrance toward the light port, and to reflect said light of said third colour entering said primary light pipe via said third light entrance toward the light port.

9. A light source assembly according to claim 6, wherein the primary light pipe comprises a hollow, elongate rectangular pipe segment extending from a first axial end of a rectangular pipe segment to the light port at a second axial end of the rectangular pipe segment, the first light entrance is an axial entrance at the first axial end of the rectangular pipe segment, the second light entrance is a lateral entrance through a side wall of the rectangular pipe segment, and the third light entrance is a lateral entrance through a side wall of the rectangular pipe segment.

10. A light source assembly comprising, in combination:
 a) a primary light pipe forming at least a light port and an elongate axial pathway from at least first and second light entrances to the light port, the second light entrance being axially spaced along the primary light pipe from the first light entrance;
 b) at least first and second light feeds for respectively feeding light of a first colour into said primary light pine via said first light entrance and feeding light of a second colour into said primary light pipe via said second light entrance; and
 c) at least a first dichroic filter positioned in the primary light pipe optically between the first and second light entrances and operative as oriented in the primary light pipe to pass said light of said first colour entering said primary light pipe via said first light entrance toward the light port, and to reflect said light of said second colour entering said primary light pine via said second light entrance toward the light port, comprising a plurality of light sources operative to generate light of a respective colour for feeding into said primary light pipe via a respective light entrance.

11. A light source assembly according to claim 10, wherein said first, second and third light sources comprise red, green and blue LEDs respectively.

12. A light source assembly comprising, in combination;
 a) a primary light pipe forming at least a light port and an elongate axial pathway from at least first and second light entrances to the light port, the second light entrance being axially spaced along the primary light pipe from the first light entrance;
 b) at least first and second light feeds for respectively feeding light of a first colour into said primary light pipe via said first light entrance and feeding light of a second colour into said primary light pipe via said second light entrance; and
 c) at least a first dichroic filter positioned in the primary light pipe optically between the first and second light entrances and operative as oriented in the primary light pipe to pass said light of said first colour entering primary light pipe via said first light entrance toward the light port, and to reflect said light of said second colour entering said primary light pipe via said second light entrance toward the light port, further comprising a tapered light collector at a respective at least one of said light entrances, operative to reduce the angular distribution of the light to be fed into the primary light pipe via said respective light entrance.

13. A light source assembly according to claim 12, wherein each tapered light collector comprises a tapered hollow light pipe or a solid-body light pipe fixedly integrated with the primary light pipe.

14. A light source assembly according to claim 12, wherein said at least one tapered light collector is an anamorphic collector.

15. A light source assembly according to claim 12, wherein said at least one tapered light collector is a focusing light collector operative to focus light from the associated light source into the primary light pipe.

16. A light source assembly according to claim 12, wherein said at least one tapered light collector is a non-focusing light collector.

17. A light source assembly comprising, in combination:
 a) a primary light pipe forming at least a light port and an elongate axial pathway from at least first and second light entrances to the light port, the second light entrance being axially spaced along the primary light pipe from the first light entrance;
 b) at least first and second light feeds for respectively feeding light of a first colour into said primary light pipe via said first light entrance and feeding light of a second colour into said primary light pipe via said second light entrance; and c) at least a first dichroic filter positioned in the primary light pine optically between the first and second light entrances and operative as oriented in the primary light pipe to pass said light of said first colour entering said primary light pipe via said first light entrance toward the light port, and to reflect said light of said second colour entering said primary light pipe via said second light entrance toward the light port, wherein said primary light pipe comprises a hollow light pipe or a solid-body light pipe.

18. A light source assembly comprising, in combination:
a) a primary light pipe forming at least a light port and an elongate axial pathway from at least first and second light entrances to the light port, the second light entrance being axially spaced along the primary light pipe from the first light entrance;
b) at least first and second light feeds for respectively feeding light of a first colour into said primary light pipe via said first light entrance and feeing light of a second colour into said primary light pipe via said second light entrance; and
c) at least a first dichroic filter positioned in the primary light pipe optically between the first and second light entrances and operative as oriented in the primary light pipe to pass said light of said first colour entering said primary light pipe via said first light entrance toward the light port, and to reflect said light of said second colour entering said primary light pipe via said second light entrance toward the light port, further comprising a reflective surface at the perimeter of at least one of the light entrances, operative to provide recirculation of cat least a portion of the light entering the primary light pipe via said respective light entrance.

19. A light source assembly comprising, in combination:
a) a primary light pipe forming at least a light port and an elongate axial pathway from at least first and second light entrances to the light port, the second light entrance being axially spaced along the primary light pipe from the first light entrance;
b) at least first and second light feeds for respectively feeding lights of a first colour into said primary light pipe via said first light entrance and feeding light of a second colour into said primary light pipe via said second light entrance;
c) at least a first dichroic filter positioned in the primary light pipe optically between the first and second light entrances and operative as oriented in the primary light pipe to pass said light of said first colour entering said primary light pipe via said first light entrance toward the light port, and to reflect said light of said second colour entering said primary light pipe via said second light entrance toward the light port;
d) at least one light valve positioned to receive light passed from the primary light pipe via the light port; and
e) at least one focusing relay lens positioned between the light port and the light valve and operative to focus light passed from the primary light pipe via the light port to the light valve.

20. A light source assembly comprising, in combination:
a) primary light pipe forming at least a light port and an elongate axial pathway from at least first and second light entrances to the light port, the second light entrance being axially spaced along the primary light pipe from the first light entrance;
b) at least first and second light feeds for respectively feeding light of a first colour into said primary light pipe via said first light entrance and feeding light of a second colour into said primary light pipe via said second light entrance; and
c) at least a first dichroic filter positioned in the primary light pie optically between the first and second light entrances and operative as oriented in the primary light pipe to pass said light of said first colour entering said primary light pipe via said first light entrance toward the light port, and to reflect said light of said second colour entering said primary light pipe via said second light entrance toward the light port, wherein said primary light pipe has a cross section in the form of a four-sided shape with four right angles.

* * * * *